US012680264B2

(12) United States Patent
Fukuda et al.

(10) Patent No.: US 12,680,264 B2
(45) Date of Patent: Jul. 14, 2026

(54) WORKING VEHICLE AND ATTACHMENT USAGE SYSTEM

(71) Applicant: Kubota Corporation, Osaka (JP)

(72) Inventors: Yuji Fukuda, Sakai (JP); Yasuhiro Nishida, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 75 days.

(21) Appl. No.: 18/777,648

(22) Filed: Jul. 19, 2024

(65) Prior Publication Data

US 2026/0022532 A1 Jan. 22, 2026

(51) Int. Cl.

| | |
|---|---|
| ***E02F 3/36*** | (2006.01) |
| ***E02F 3/96*** | (2006.01) |
| ***E02F 9/20*** | (2006.01) |
| ***E02F 9/26*** | (2006.01) |
| *G08C 17/02* | (2006.01) |

(52) U.S. Cl.

CPC .......... *E02F 3/3663* (2013.01); *E02F 3/3631* (2013.01); *E02F 3/96* (2013.01); *E02F 9/2004* (2013.01); *E02F 9/26* (2013.01); *G08C 17/02* (2013.01)

(58) Field of Classification Search

None

See application file for complete search history.

(56) References Cited

U.S. PATENT DOCUMENTS

| | | | | |
|---|---|---|---|---|
| 4,818,172 | A * | 4/1989 | Johnson | B66C 23/80 414/547 |
| 6,176,496 | B1 * | 1/2001 | Busch | F16F 9/145 280/124.159 |
| 11,421,396 | B2 * | 8/2022 | Wu | E02F 9/262 |
| 2004/0074115 | A1 * | 4/2004 | Curtis | E01H 5/066 37/231 |
| 2020/0011029 | A1 * | 1/2020 | Sano | E02F 9/265 |
| 2021/0120729 | A1 * | 4/2021 | Miyashita | A01B 69/008 |
| 2022/0412040 | A1 | 12/2022 | Zitterbart et al. | |

* cited by examiner

*Primary Examiner* — Hunter B Lonsberry
*Assistant Examiner* — Robert L Pinkerton
(74) *Attorney, Agent, or Firm* — Keating & Bennett, LLP

(57) ABSTRACT

A working vehicle includes a machine body, a lifter on the machine body, a linkage to attach and detach an attachment thereto and therefrom, the linkage being supported by the lifter such that the linkage is raisable and lowerable by the lifter, and a controller configured or programmed to select identification information of the attachment attached to the linkage and start a predetermined process based on the selected identification information. The lifter is operable to be driven by at least one hydraulic actuator to raise or lower the linkage. The controller is configured or programmed to select the identification information of the attachment attached to the linkage based on a pressure of hydraulic fluid supplied to the at least one hydraulic actuator, the pressure being a pressure of hydraulic fluid supplied when the attachment is caused to be out of contact with a contact surface by the lifter.

20 Claims, 19 Drawing Sheets

L1

| Name | Attachment ID | Specifications |
| --- | --- | --- |
| Bucket | ATT0001 | Excavation, Large, Total length, Total width, etc. |
| Spreader | ATT0002 | Spreading, Total length, Total width, etc. |
| Skid cutter | ATT0003 | Mowing, Small, Total length, Total width, etc. |
| Pallet fork | ATT00xy | Cargo handling, Total length, Total width, etc. |
| Bucket | ATT00xx | Excavation, Small, Total length, Total width, etc. |
| | ⋮ | ⋮ |

Fig.5

Fig.7

| Attachment ID | Display data |
|---|---|
| ATT0001 | Name<br>Specifications<br>Icon etc. |
| ATT0002 | Name<br>Specifications<br>Icon etc. |
| ATT0003 | Name<br>Specifications<br>Icon etc. |
| ⋮ | ⋮ |

Fig.8

| Attachment ID | Control data<br>Amount of supply of hydraulic fluid |
|---|---|
| ATT0001 | None |
| ATT0002 | Small |
| ATT0003 | Large |
| ⋮ | ⋮ |

<Attachment information collecting process>

WORKING VEHICLE AND ATTACHMENT USAGE SYSTEM

BACKGROUND OF THE INVENTION

1. Field of the Invention

The present invention relates to techniques to use attachments on working vehicles.

2. Description of the Related Art

For example, the specification of U.S. Patent Application Publication No. 2022/412040 discloses a system to automatically determine the positions of attachments in the vicinity of a working vehicle. The system is such that a first communication unit (tool module) including a first acceleration sensor is provided on an attachment such as a bucket, a quick changer configured to quickly and simply attach and detach the attachment thereto and therefrom is provided at the distal end of the boom of the working vehicle (excavator), a second communication unit (receiving module) including a second acceleration sensor is provided at the quick changer, and the working vehicle is provided with an identification module and a controller.

The first communication unit transmits, to the second communication unit via a near field communication such as RFID or Bluetooth (registered trademark) Low Energy, a first acceleration signal relating to the instantaneous acceleration of the attachment detected by the first acceleration sensor and an identifying signal of the attachment. The second communication unit transmits, to the identification module, the first acceleration signal and the identifying signal received from the first communication unit and the second acceleration signal relating to the instantaneous acceleration of the quick changer detected by the second acceleration sensor. The identification module identifies the attachment attached to the quick changer based on the comparison (e.g., difference) between the first acceleration signal and the second acceleration signal received from the second communication unit and/or the received signal strength of the first acceleration signal, and transmits the identification information of the attachment to the controller. The controller performs an appropriate operation (work operation) of the working vehicle based on the received identifying signal.

However, in related systems as described above, the identification module identifies attachments based on the comparison between the first acceleration signal and the second acceleration signal and the like, but there is a possibility for an attachment not to be accurately identified depending on, for example, the environment in which the attachment is attached to a quick changer.

SUMMARY OF THE INVENTION

One or more example embodiments of the present invention make it possible for working vehicles to easily improve the accuracy of identifying attachments.

A working vehicle according to an example embodiment of the present invention includes a machine body, a lifter on the machine body, a linkage to attach and detach an attachment thereto and therefrom, the linkage being supported by the lifter such that the linkage is raisable and lowerable by the lifter, and a controller configured or programmed to select identification information of the attachment attached to the linkage and start a predetermined process based on the selected identification information, wherein the lifter is operable to be driven by at least one hydraulic actuator to raise or lower the linkage, and the controller is configured or programmed to select the identification information of the attachment attached to the linkage based on a pressure of hydraulic fluid supplied to the at least one hydraulic actuator, the pressure being a pressure of hydraulic fluid supplied when the attachment is caused to be out of contact with a contact surface by the lifter.

The working vehicle may further include an operation actuator to be operated to attach the attachment to the linkage. The controller may be configured or programmed to select the identification information of the attachment attached to the linkage based on the pressure of the hydraulic fluid supplied when the attachment attached to or to be attached to the linkage is caused to be out of contact with the contact surface by the lifter, and the operation actuator is operated to attach the attachment to the linkage.

The linkage may include a hitch selectively operable in a first mode in which the attachment is allowed to be attached and detached or a second mode in which the attachment is restricted from being attached and detached. The controller may be configured or programmed to select the identification information of the attachment attached to the linkage based on the pressure of the hydraulic fluid supplied when the hitch is switched from the first mode to the second mode to attach the attachment thereto by operation of the operation actuator.

The working vehicle may further include an operation actuator to be operated to attach the attachment to the linkage. The controller may be configured or programmed to select the identification information of the attachment attached to the linkage based on the pressure of the hydraulic fluid supplied when, upon operation of the operation actuator, the attachment is attached to the linkage and then the attachment attached to the linkage is caused to be out of contact with the contact surface by the lifter.

The working vehicle may further include an input to receive input of input information differing from the pressure of the hydraulic fluid. The controller may be configured or programmed to select the identification information of the attachment attached to the linkage based on the pressure of the hydraulic fluid in addition to the input information.

The input may include a receiver to receive a wireless signal which is periodically transmitted from a transmitter in or on the attachment, which includes the identification information of the attachment, and which is compliant with a near field communication standard, the wireless signal being the input information received by the receiver. The controller may be configured or programmed to select the identification information of the attachment attached to the linkage based on the wireless signal and the pressure of the hydraulic fluid from one or more pieces of identification information included in one or more of the wireless signals received by the receiver.

The controller may be configured or programmed to select the identification information of the attachment attached to the linkage based on a received signal strength of the wireless signal and the pressure of the hydraulic fluid.

The input may include a user interface to allow a selection of information indicating an attachment from a plurality of the attachments attachable to the linkage, and receive input of the selected information as the input information. The controller may be configured or programmed to select the identification information of the attachment attached to the linkage based on the information indicating the attachment selected via the user interface and based on the pressure of the hydraulic fluid.

The controller may be configured or programmed to perform a first process in which the controller provisionally selects a candidate for the identification information of the attachment attached to the linkage based on the input information, and a second process in which the controller determines whether an attachment corresponding to the candidate for the identification information provisionally selected in the first process is the attachment attached to the linkage based on the pressure of the hydraulic fluid.

The controller may be configured or programmed to, if no input information has been received or the input information does not satisfy a predetermined selection condition and the controller fails to provisionally select a candidate for the identification information in the first process, select the identification information of the attachment attached to the linkage based on the pressure of the hydraulic fluid in the second process.

The controller may be configured or programmed to perform a first process in which the controller provisionally selects a candidate for the identification information of the attachment attached to the linkage based on the pressure of the hydraulic fluid, and a second process in which the controller determines whether an attachment corresponding to the candidate for the identification information provisionally selected in the first process is the attachment attached to the linkage based on the input information.

The transmitter may be configured or programmed to transmit the wireless signal which includes a criterion. The controller may be configured or programmed to calculate information-for-determination which is based on the pressure of the hydraulic fluid, and select the identification information corresponding to the criterion satisfied by the information-for-determination.

The working vehicle may further include a memory and/or storage to store a plurality of pieces of identification information of a plurality of the attachments attachable to the linkage and one or more criteria such that the plurality of pieces of identification information and the one or more criteria are associated with each other. The controller may be configured or programmed to calculate information-for-determination which is based on the pressure of the hydraulic fluid, and select the identification information associated with one of the one or more criteria that is satisfied by the information-for-determination.

The at least one hydraulic actuator may include at least one hydraulic cylinder including a tubular cylinder and a piston rod insertable in the tubular cylinder such that the piston rod is extendable out of and retractable into the tubular cylinder. The at least one hydraulic cylinder may be operable to extend or retract by extension or retraction of the piston rod from or into the tubular cylinder to drive the lifter. The controller may be configured or programmed to select the identification information of the attachment attached to the linkage based on the pressure of the hydraulic fluid at at least one of (i) a first port located on a piston side of the at least one hydraulic cylinder or (ii) a second port located on a rod side of the at least one hydraulic cylinder.

The lifter may include at least one arm supported on the machine body swingably up and down and including a distal portion supporting the linkage swingably up and down. The at least one hydraulic cylinder may include at least one first hydraulic cylinder to cause the at least one arm to swing and at least one second hydraulic cylinder to cause the linkage to swing. The controller may be configured or programmed to select the identification information of the attachment attached to the linkage based on the pressure of the hydraulic fluid supplied to the at least one first hydraulic cylinder and/or the pressure of the hydraulic fluid supplied to the at least one second hydraulic cylinder.

The controller may be configured or programmed to calculate weight information relating to a weight of the attachment attached to the linkage based on the pressure of the hydraulic fluid supplied to the at least one first hydraulic cylinder, calculate dimension information relating to a dimension of the attachment attached to the linkage in a direction extending from the linkage based on the pressure of the hydraulic fluid supplied to the at least one second hydraulic cylinder, and select the identification information of the attachment attached to the linkage based on the weight information and the dimension information.

The controller may be configured or programmed to calculate a thrust force of the at least one second hydraulic cylinder based on the pressure of the hydraulic fluid supplied to the at least one second hydraulic cylinder, and calculate the dimension information based on the thrust force and the weight information.

The controller may be configured or programmed to calculate weight information relating to a weight of the attachment attached to the linkage based on the pressure of the hydraulic fluid supplied to the at least one hydraulic cylinder, allow supply of the hydraulic fluid to the attachment attached to the linkage if the weight information indicates that the attachment is attached to the linkage, and not allow the supply of the hydraulic fluid if the weight information indicates that no attachments are attached to the linkage.

The working vehicle may further include a user interface to output information indicating that the attachment corresponding to the identification information selected by the controller is attached. The controller may be configured or programmed to calculate weight information relating to a weight of the attachment attached to the linkage based on the pressure of the hydraulic fluid supplied to the at least one hydraulic cylinder. The user interface may be operable to output information indicating that the attachment corresponding to the identification information selected by the controller is not attached if the weight information indicates that no attachments are attached to the linkage.

An attachment usage system according to an example embodiment of the present invention includes a linkage to attach and detach an attachment thereto and therefrom, the linkage being supported by a lifter on a machine body of a working vehicle such that the linkage is raisable and lowerable by the lifter, and a controller configured or programmed to select identification information of the attachment attached to the linkage and start a predetermined process based on the selected identification information, wherein the lifter is operable to be driven by at least one hydraulic actuator to raise or lower the linkage, and the controller is configured or programmed to select the identification information of the attachment attached to the linkage based on a pressure of hydraulic fluid supplied to the at least one hydraulic actuator, the pressure being a pressure of hydraulic fluid supplied when the attachment is caused to be out of contact with a contact surface by the lifter.

The above and other elements, features, steps, characteristics and advantages of the present invention will become more apparent from the following detailed description of example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 5 is a screen showing an example of an attachment list.

FIG. 7 is a diagram showing an example of the relationship between attachment IDs and corresponding pieces of display data.

FIG. 8 is a diagram showing an example of the relationship between attachment IDs and corresponding pieces of control data.

DETAILED DESCRIPTION OF EXAMPLE EMBODIMENTS

Figure 1:
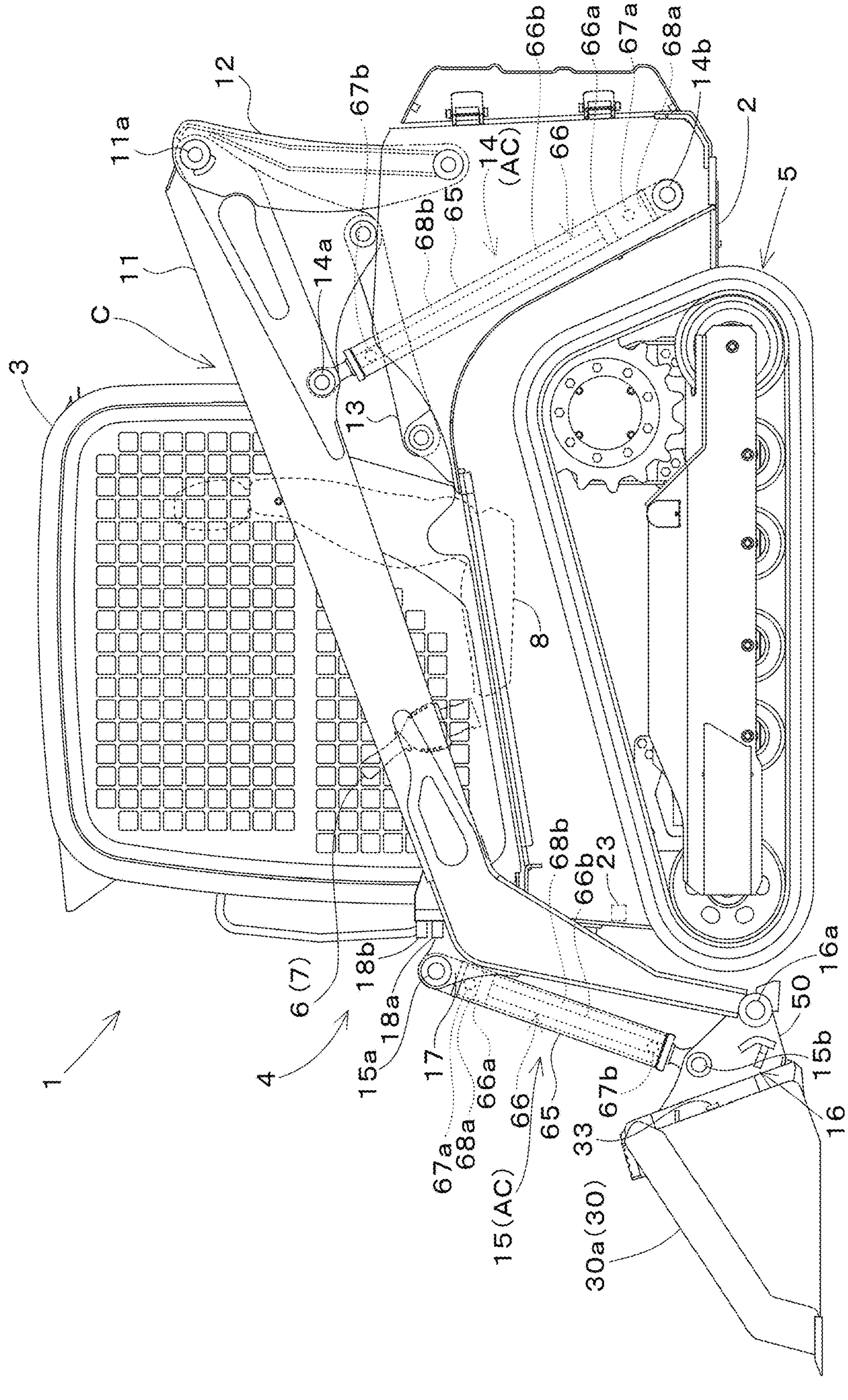
FIG. 1 is a side view of a working vehicle.

Example embodiments will now be described with reference to the accompanying drawings, wherein like reference numerals designate corresponding or identical elements throughout the various drawings. The drawings are to be viewed in an orientation in which the reference numerals are viewed correctly.

The following description discusses example embodiments of the present invention with reference to the drawings as needed.

FIG. 1 is a side view of a working vehicle 1 according to the present example embodiment. In the present example embodiment, a compact track loader is discussed as an example of the working vehicle 1. Note, however, that the working vehicle according to an example embodiment of the present invention is not limited to a compact track loader, and may be, for example, some other construction machine or agricultural machine such as a skid-steer loader, a backhoe, or a tractor.

The working vehicle 1 includes a machine body 2, a cabin 3, a working device 4, and traveling device(s) 5. The cabin 3 is provided on the machine body 2. The cabin 3 includes a user's seat 8, operation members (manual operators) to be operated by a user seated on the user's seat 8, and/or the like. The manual operators include a travel operator 6 to be operated to actuate the traveling devices 5 and a work operator 7 to be operated to actuate the working device 4.

The traveling devices 5 are provided on the left and right sides of the machine body 2 and support the machine body 2 such that the machine body 2 is allowed to travel. The traveling devices 5 are crawler traveling devices. The user operates the travel operator 6 to cause both the left and right traveling devices 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the machine body 2 (working vehicle 1) to travel forward, rearward, or turn left or right. Note that the traveling devices 5 are not limited to crawler traveling devices, and may be tire traveling devices.

The working device 4 is attached to the machine body 2. The working device 4 includes a lifter C, a linkage 16, and an attachment 30.

The lifter C is provided on the machine body 2. The lifter C supports the linkage 16 and the attachment 30 such that the lifter C, by being driven, can raise and lower the linkage 16 and the attachment 30. The linkage 16 is supported by the lifter C such that the linkage 16 is raisable and lowerable by the lifter C, and is operable to attach and detach the attachment 30 thereto and therefrom.

The attachment 30 is a working tool such as a bucket 30*a*, and can be attached to or detached from the linkage 16. Examples of the attachment 30 other than the bucket 30*a* include earth augers, angle brooms, crushers, grapples, cold planers, sweepers, skid cutters, skid graders, stump grinders, snow blowers, snow pushers, spreaders, dozer blades, trenchers, breakers, pallet forks, hopper brooms, mowers, rippers, loader arms, rotary tillers and the like. Furthermore, attachments 30 of each type may have different specifications such as work content, structure, size (for example, dimension in a front-rear direction (total length), dimension in a lateral direction (total width), dimension in an up-and-down direction (total height)), mass (in other words, weight), the position of the center of gravity, shape, and/or the like.

Specifically, the lifter C is driven by hydraulic actuator(s) AC to raise and lower the linkage 16. In the present example embodiment, the lifter C includes arm(s) 11, lift link(s) 12, control link(s) 13, and the hydraulic actuator(s) AC. The arm(s) 11, the lift link(s) 12, and the control link(s) 13 define a linked body to be driven by the hydraulic actuator(s) AC.

A pair of the arms 11, a pair of the lift links 12, and a pair of the control links 13 are provided on the left and right sides of the cabin 3. The left and right arms 11 are supported on the machine body 2 swingably up and down, and include distal portions to support the linkage 16 swingably up and down. The left and right arms 11 are connected together by a connector 17 at an intermediate portion of their front portion. The left arm 11 has, at the front portion thereof, a hydraulic fluid outlet port (power output port) 18*a* and a hydraulic fluid inlet port 18*b*.

The lift links 12 and the control links 13 support the proximal portions (rear portions) of the arms 11 via shafts such that the arms 11 are swingable up and down.

The hydraulic actuators AC are driven by supplied hydraulic fluid. The hydraulic actuators AC include, for example, hydraulic cylinders 14 and 15 each including a tubular cylinder 65 and a piston rod 66 insertable in the tubular cylinder 65 such that the piston rod 66 is extendable out of and retractable into the tubular cylinder 65. The hydraulic cylinders 14 and 15 extend or retract by the extension or retraction of the piston rod 66 from or into the tubular cylinder 65 to drive the lifter C. The hydraulic cylinders 14 and 15 are double-acting hydraulic cylinders each including (i) a first port 67*a* via which hydraulic fluid is supplied to the tubular cylinder 65 to move the piston rod 66 in a direction in which the piston rod 66 extends out of the tubular cylinder 65 and (ii) a second port 67*b* via which hydraulic fluid is supplied to the tubular cylinder 65 to move the piston rod 66 in a direction in which the piston rod 66 retracts into the tubular cylinder 65.

The piston rod 66 includes a piston 66*a* and a rod 66*b*. The piston 66*a* is insertable in the tubular cylinder 65 such that the piston 66*a* is movable in the axial direction. The rod 66*b* is a rod component coupled to the piston 66*a*, and extends from a first end of the cylinder 65. The first port 67*a* is located at a second end of the tubular cylinder 65 (at the opposite end of the tubular cylinder 65 from the first end from which the rod 66*b* extends, i.e., the first port 67*a* is located at the piston 66*a* side of the tubular cylinder 65). The first port 67*a* is in communication with the fluid chamber at the second end (first fluid chamber 68*a*) of the tubular cylinder 65. On the other hand, the second port 67*b* is located at the first end of the tubular cylinder 65 (at the first end of the tubular cylinder 65 from which the rod 66*b* extends, i.e., the second port 67*b* is located at the rod 66*b* side of the tubular cylinder 65). The second port 67*b* is in communication with the fluid chamber at the first end (second fluid chamber 68*b*) of the tubular cylinder 65.

Thus, each of the hydraulic cylinders 14 and 15 as a whole is caused to extend or retract by supplying and discharging hydraulic fluid, through the first port 67*a* and the second port 67*b*, into and from the spaces (the first fluid chamber 68*a* and the second fluid chamber 68*b*) in the tubular cylinder 65 partitioned by the piston 66*a* to cause the piston rod 66 to extend out of or retract into the cylinder 65.

The hydraulic cylinders 14 and 15 include first hydraulic cylinders 14 and second hydraulic cylinders 15. The first hydraulic cylinders 14 are arm cylinders to cause the arms 11 to swing. Each arm cylinder 14 is provided to connect a corresponding arm 11 and the machine body 2 (specifically, a frame chassis). Specifically, a first end of the arm cylinder 14 is rotatably connected to the arm 11 via a shaft 14*a*, and a second end of the arm cylinder 14 is rotatably connected to a lower rear portion of the machine body 2 via a shaft 14*b*. Thus, when the driver of the working vehicle 1 operates the work operator 7, the entirety of the arm cylinders 14 extend or retract to raise or lower the arms 11 (swing up or down).

The second hydraulic cylinders 15 are front cylinders to cause the linkage 16 to swing. Each front cylinder 15 is provided to connect a corresponding arm 11 and the linkage 16. Specifically, a first end of the front cylinder 15 is rotatably connected to the arm 11 via a shaft 15*a*, and a second end of the front cylinder 15 is rotatably connected to an upper rear portion of the linkage 16 via a shaft 15*b*. Thus, when the driver of the working vehicle 1 operates the work operator 7, the entirety of the front cylinders 15 extend or retract to cause the linkage 16 to swing up or down and perform shoveling or dumping.

The attachment 30 connected to the linkage 16 is raised or lowered by the arms 11 and the linkage 16 ascending or descending in the above-described manner.

Note that the lifter C described above is an example and that this does not imply any limitation. For example, in the case where the working vehicle 1 is a backhoe, the lifter includes arm(s) and boom(s) and the like. In the case where the working vehicle 1 is a tractor, the lifter includes a three-point linkage and/or the like. The hydraulic actuators AC, which are double-acting hydraulic cylinders as described as examples, are not limited as such and may be single acting hydraulic cylinders.

The following details the linkage 16. The linkage 16 is a quick hitch (hitch) selectively operable in a first mode in which attachments 30 are allowed to be attached and detached or a second mode in which attachments 30 are restricted from being attached and detached. The proximal end of the quick hitch 16 is attached to the distal portions of the arms 11 via shaft(s) 16*a* such that the quick hitch 16 is swingable up and down. The quick hitch 16 can easily attach and detach various types of attachments 30 thereto and therefrom. The driver of the working vehicle 1 can easily replace the attachment 30 with another one using the quick hitch 16. For this reason, the quick hitch 16 is also called a "quick changer". In the example shown in FIG. 1, a bucket 30*a*, which is an example of the attachment 30, is attached to the front portion of the quick hitch 16.

Figure 2:
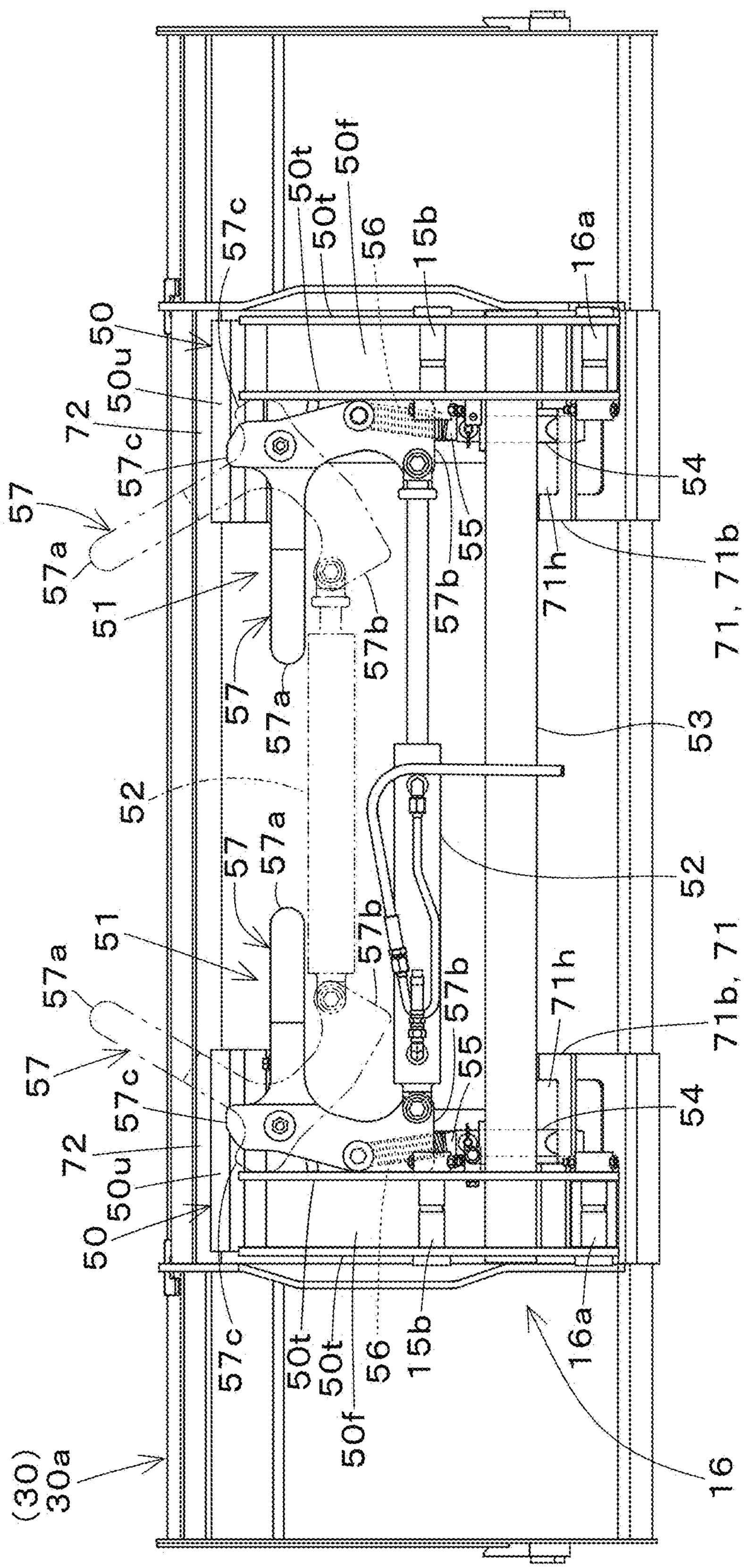
FIG. 2 is a front view of a quick hitch.
Figure 3A:
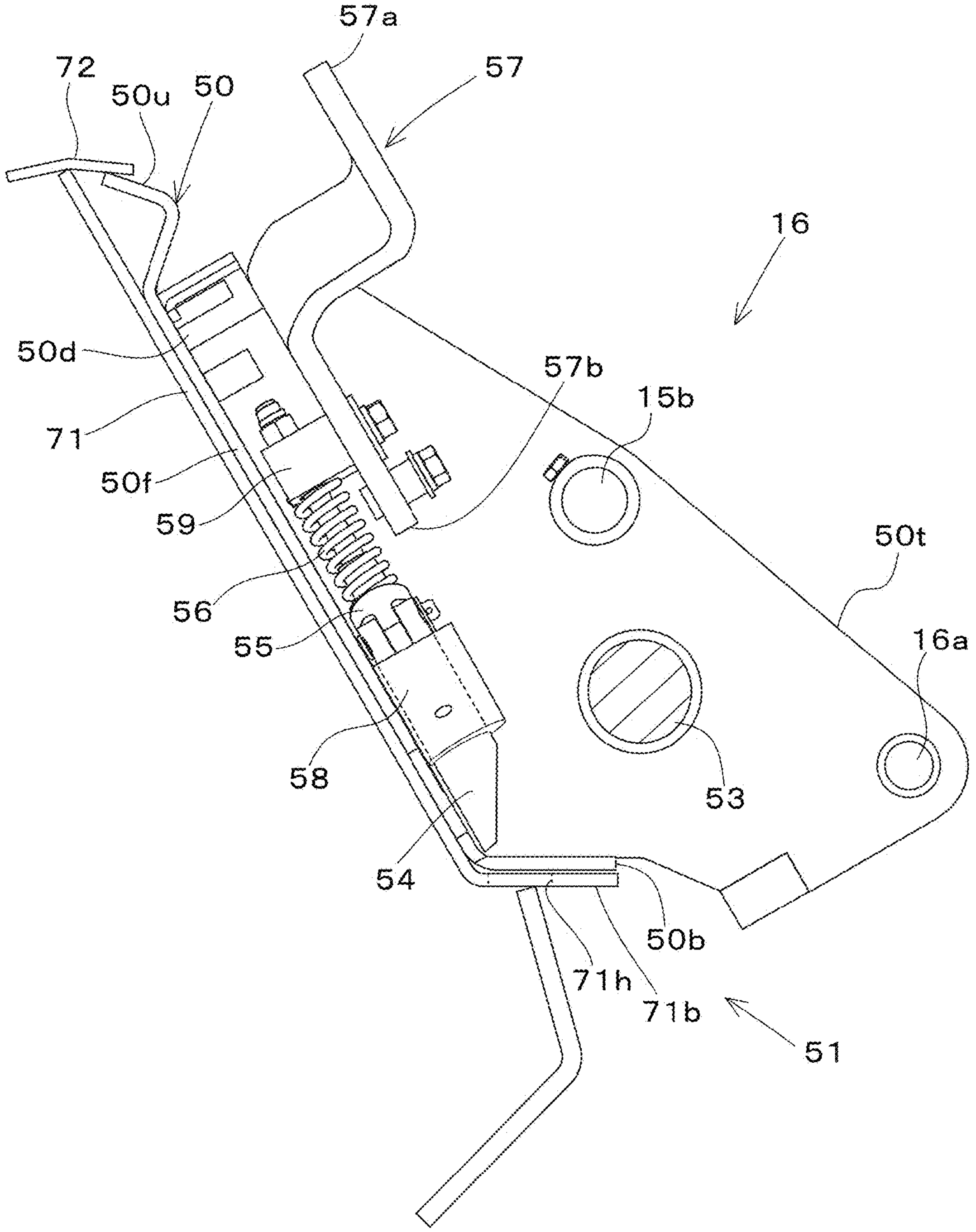
FIG. 3A is a side view showing a quick hitch unlatching an attachment.
Figure 3B:
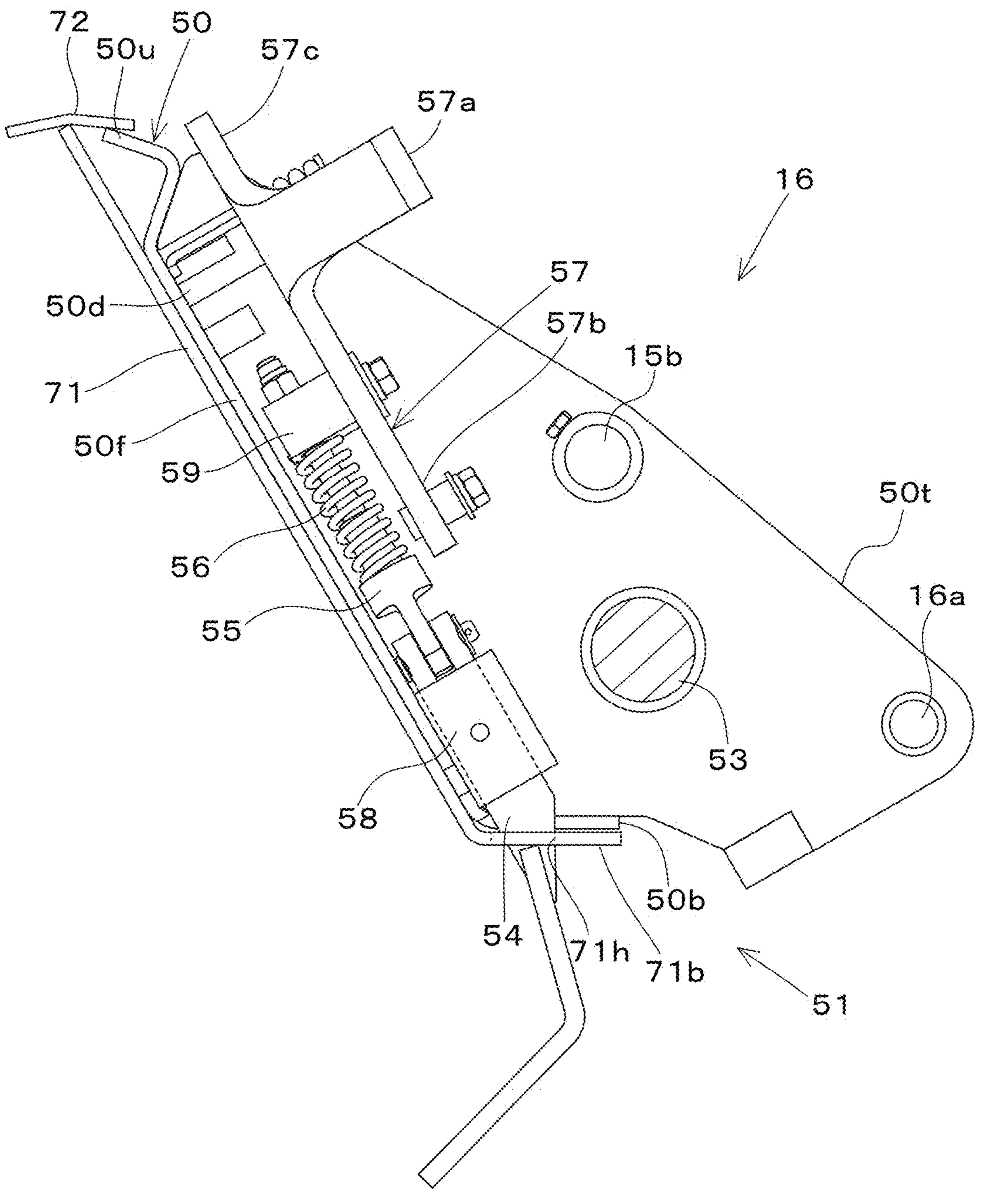
FIG. 3B is a side view showing a quick hitch latching an attachment.

FIG. 2 is an elevational view of the quick hitch 16. Specifically, FIG. 2 illustrates the quick hitch 16 in FIG. 1 as viewed from the machine body 2 of the working vehicle 1. FIG. 3A is a side view illustrating the quick hitch 16 in an unlatching state. FIG. 3B is a side view illustrating the quick hitch 16 in a latching state.

The quick hitch 16 includes a pair of left and right brackets 50, a pair of left and right latching mechanisms 51, a latch cylinder 52, and the like. The brackets 50 hold the attachment 30. The latching mechanisms 51, when in the first mode, do not hold (secure) the attachment 30 to allow the attachment 30 to be detached from the brackets 50 (unlatching state). The latching mechanisms 51, when in the second mode, have the attachment 30 secured to the brackets 50 (quick hitch 16) to restrict the attachment 30 from being detached or restrict an attachment 31 to be attached (latching state). The latch cylinder 52 is a latch actuator to actuate the latching mechanisms 51 selectively in the unlatching state or the latching state. In other words, the quick hitch 16 is switched between the first mode and the second mode by the latch cylinder 52 being driven.

As illustrated in FIG. 3A, each of the brackets 50 includes a front plate 50*f* and a pair of connector plates 50*t* projecting rearward from the front plate 50*f*. The connector plates 50*t* have pivotally connected thereto the distal ends of the left and right arms 11 (FIG. 1) via shafts 16*a*, and have pivotally connected thereto ends of the left and right front cylinders 15 (FIG. 1) via shafts 15*b*. The connector plates 50*t* are connected to a beam 53, so that the pair of brackets 50 are combined.

The front plate 50*f* of each of the brackets 50 includes an upper portion 50*u* bent in the form of the letter V as illustrated in FIG. 3A. The front plate 50*f* includes a lower portion 50*b* bent such that the lower portion 50*b* projects diagonally rearward. A top plate 72 bent downward is provided above a base plate 71 of the attachment 30. The base plate 71 includes a lower portion 71*b* bent such that the lower portion 71*b* projects diagonally rearward. The lower portion 71*b* of the base plate 71 has a through-hole 71*h*.

The upper portions 50*u* of the front plates 50*f* of the brackets 50 are inserted into the gap between the base plate 71 and the top plate 72 of the attachment 30 and engage with the back surface of the top plate 72, the front surfaces of the front plates 50*f* engage with the base plate 71, and the lower portions 50*b* of the front plates 50*f* engage with the lower portion 71*b* of the base plate 71. With this, the attachment 30 is held by the brackets 50 (latching state, second mode).

The latching mechanisms 51 are located inward of the connector plates 50*t* of the brackets 50 in FIG. 2. Each of the latching mechanisms 51 includes, as illustrated in FIG. 21A, a latch pin 54, a link 55, a coil spring 56, a latch lever 57, and the like. The latch pin 54 is held by a housing 58 fixed to a corresponding bracket 50 such that the latch pin 54 is movable up and down. The latch pin 54 includes a lower portion projecting downward from the housing 58, and the lower portion has an inclined surface sloping diagonally forward and downward. The latch pin 54 includes an upper portion rotatably connected to a lower end portion of the link 55 via pin(s). The link 55 is inserted in the coil spring 56. The link 55 includes an upper end portion projecting from the coil spring 56, and the upper end portion is held by a holder 59.

Each latch lever 57 is substantially in the form of the letter L as illustrated in FIG. 20. The latch lever 57 includes a bent intermediate portion which is rotatably connected to a mount 50*d* on a corresponding bracket 50 via pin(s) as illustrated in FIG. 3A. The latch lever 57 includes a first projecting portion 57*a* which projects inward from corresponding connector plates 50*t* as illustrated in FIG. 2. The latch lever 57 includes a second projecting portion 57*b* projecting downward. The second projecting portion 57*b* has, connected to a back surface of a central portion thereof, the holder 59 via pin(s) as illustrated in FIG. 3A. The latch lever 57 includes a third projecting portion 57*c* which projects upward as illustrated in FIG. 2.

The latch cylinder 52 is a hydraulic cylinder which is positioned laterally and located above the beam 53. The latch cylinder 52 has a first end (distal end of the rod) pivotally connected to the distal end portion of the second projecting portion 57*b* of one of the latch levers 57 (right latch lever 57 in FIG. 2) via pin(s). The latch cylinder 52 has a second end (bottom of the cylinder case) pivotally connected to the distal end portion of the second projecting portion 57*b* of the other of the latch levers 57 (the left latch lever 57 in FIG. 2) via pin(s).

The retraction of the latch cylinder 52, as indicated by dot-dot-dash lines in FIG. 2, causes the second projecting portions 57*b* of the left and right latch levers 57 to approach each other, causing the latch levers 57 to pivot upward. Then, as illustrated in FIG. 3A, the links 55 and the latch pins 54 move upward and the latch pins 54 detach from the through-holes 71*h* in the base plate 71 of the attachment 30.

With this, the latching mechanisms 51 are placed in their unlatching state (first mode) in which the latching mechanisms 51 do not hold the attachment 30, allowing the attachment 30 to be detached from the quick hitch 16. The third projecting portions 57*c* of the latch levers 57 contact corresponding connector plates 50*t* of the brackets 50, so that the degree of retraction of the latch cylinder 52, the angle of upward rotation of the latch levers 57, and the degree of upward movement of the latch pins 54 are restricted.

Upon the extension of the latch cylinder 52 as indicated by solid lines in FIG. 2 from the state as illustrated in FIG. 3A, the second projecting portions 57*b* of the left and right latch levers 57 are pushed to cause the latch levers 57 to pivot downward. Upon such pivoting, the holders 59 cause the links 55 and the latch pins 54 to move downward and compress the coil springs 56. Then, as illustrated in FIG. 3B, the latch pins 54 are inserted in the through-holes 71*h* in the base plate 71 of the attachment 30, so that the inclined surfaces of the latch pins 54 contact the side walls of the through-holes 71*h*.

With this, the latching mechanisms 51 are placed in their latching state (second mode) in which the latching mechanisms 51 hold the attachment 30, and the attachment 30 is attached to the quick hitch 16. The second projecting portions 57*b* of the latch levers 57 contact corresponding connector plates 50*t* of the brackets 50, so that the degree of extension of the latch cylinder 52, the angle of downward rotation of the latch levers 57, and the degree of downward movement of the latch pins 54 are restricted. It is noted here that the spring back force of the coil springs 56 holds the latch levers 57 in position. Since the first projecting portions 57*a* of the latch levers 57 are positioned horizontally, the user seated on the user's seat 8 of the working vehicle 1 confirms that the attachment 30 is attached to the quick hitch 16 (working vehicle 1) by looking at the horizontally positioned first projecting portions 57*a*.

Starting from the state as illustrated in FIG. 1 in which the bucket 30*a* is attached to the quick hitch 16, the bucket 30*a* is detached and another attachment 30 is attached to the quick hitch 16. This makes it possible to perform work other than excavation (or some other excavation work) using the other attachment 30.

Figure 4:
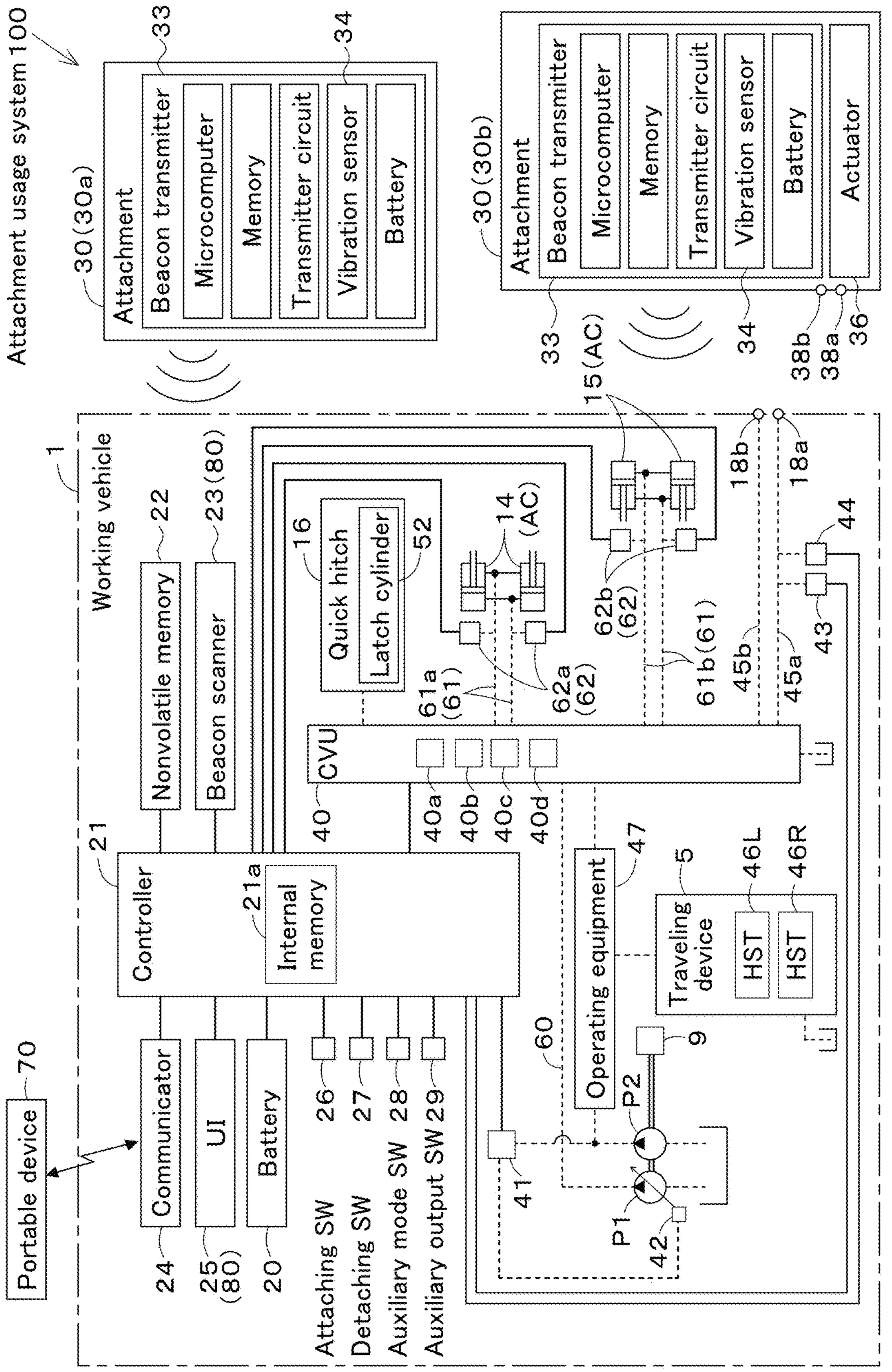
FIG. 4 is a block diagram of an attachment usage system and a working vehicle.

FIG. 4 is a block diagram of an attachment usage system 100 and the working vehicle 1 according to the present example embodiment. The attachment usage system 100 includes the working vehicle(s) 1 and attachment(s) 30. The example in FIG. 4 includes one working vehicle 1 and two attachments 30, but the number of working vehicles 1 and the number of attachments 30 included in the attachment usage system 100 may be selected appropriately.

The working vehicle 1 includes a controller 21, a storing device (memory and/or storage) 22, a receiver 23, a communicator 24, a user interface (indicated as "UI" in FIG. 4) 25, a battery 20, switches (each indicated as "SW" in FIGS. 4) 26 to 29, and/or the like.

The controller 21 may include a processing circuit that includes one or more processors. The controller 21 is configured or programmed to control the working vehicle 1 and performs various controls relating to the working vehicle 1. The controller 21 is communicably connected to a plurality of devices in or on the working vehicle 1 via in-vehicle network(s) such as CAN, ISOBUS, LIN, FlexRay and/or the like.

The controller 21 may include one or more memories, various kinds of analog circuits, various kinds of digital circuits, and/or the like. The one or more memories contain (store) software program(s) to be executed by one or more processors and various data. Specifically, among the one or more memories included in the controller 21, a memory 21*a* (internal memory) includes a volatile or nonvolatile memory. The controller 21 uses, for example, a predetermined storage area of the memory 21*a* including a volatile memory as a buffer for temporary storage of information and data.

The controller 21 is communicably connected to the storing device 22 (nonvolatile memory), and the storing device 22 is provided externally to the controller 21. The memory 21*a* and the storing device 22 store software program(s) and control data for the controller 21 to control the operation of each element. The storing device 22 stores pieces of control data corresponding to various types of attachments 30.

The controller 21 is configured or programmed to read the software program(s) and control data from the storing device 22 and perform various processes based on the software program(s) and the control data, via one or more processors. Note that the controller 21 may be configured or programmed to also perform various processes based on predetermined logic circuit(s) via one or more processors.

Examples of the processors include central processing unit (CPU), graphics processing unit (GPU), digital signal processor (DSP), field programmable gate array (FPGA), and application specific integrated circuit (ASIC).

Note that the controller 21 may include a plurality of physically separated processors cooperating to perform various processes, and the structure thereof is not limited to those described above. In such a case, the plurality of processors are provided in or on respective one or more computers physically separated from the working vehicle 1, and are communicably connected to each other via a network such as an in-vehicle network, LAN, WAN, and/or the Internet.

The software program(s) may be stored in recording medium (media) (nonvolatile memory (memories) such as HDD, SSD, CD-ROM, and/or DVD-ROM) communicably connected to the controller 21 and/or external server device (s) connected to the controller 21 via a network, and may be installed from the medium, the server device, and/or the like into the memory.

The receiver 23 is a device to receive wireless signals Q1 compliant with a near field communication standard. Specifically, the receiver 23 is a beacon scanner to receive wireless signals Q1 (may be referred to as "advertisement signals", "advertisement packets", or "beacon signals") compliant with Bluetooth (registered trademark) Low Energy which is a near field communication standard. The beacon scanner 23 measures the received signal strength indicator (RSSI, received signal strength) of the received wireless signals Q1. Note that RSSI may be hereinafter simply referred to as received signal strength. The beacon scanner 23 is provided in or on the machine body 2.

The communicator 24 communicates with a portable device 70 via the Internet or wireless LAN. The portable device 70 is a smartphone, a tablet computer, and/or the like. The user interface 25 includes, for example, a touchscreen (touch panel) and/or the like. Note that, as another example, the user interface 25 may include an input to receive input of information (e.g., physical operation switch) and an output to output information (e.g., display) provided independently of each other.

The battery 20 supplies electricity to electric equipment in and/or on the working vehicle 1. The attaching switch 26, the detaching switch 27, the auxiliary mode switch 28, and the auxiliary output switch 29 are respective operation switches to be operated by the user of the working vehicle 1. The attaching switch 26 and the detaching switch 27 are momentary operation switches. The user interface 25 and the switches 26 to 29 are provided operably in the vicinity of the user's seat 8 in the cabin 3.

The attaching switch (first operation switch, operation actuator) 26 is operated to attach the attachment 30 to the quick hitch 16. The detaching switch (second operation switch) 27 is operated to allow the attachment 30 to be detached from the quick hitch 16. The auxiliary mode switch 28 is operated to start an auxiliary mode in which predetermined attachment(s) 30 are usable. The auxiliary output switch (third operation switch) 29 is operated to supply (transmit) hydraulic fluid as power to the hydraulic fluid outlet port 18*a*.

Note that in the present example embodiment, the cases where the working vehicle 1 includes an attaching switch 26 to attach an attachment 30 to the quick hitch 16 and a detaching switch 27 to allow an attachment 30 to be detached from the quick hitch 16 are discussed. However, the working vehicle 1 may include a single operation switch (attaching/detaching switch) to selectively receive an operation to attach an attachment 30 to the quick hitch 16 or an operation to detach an attachment 30 from the quick hitch 16. In other words, the operation actuator 26 to be operated to attach an attachment 30 to the quick hitch 16 may also function as a switch to receive an operation to detach an attachment 30 from the quick hitch 16.

The switches 26 to 29, the travel operator 6, the work operator 7 and the like are not limited to hardware operation switches, operating levers and the like, and, for example, may be software keys and the like on the display screen of the user interface 25.

The working vehicle 1 includes, as hydraulic-related features, a main pump P1, a pilot pump P2, a control valve unit (indicated as "CVU" in FIG. 4) 40, a proportional valve 41, a regulator 42, sensors 43 and 44, hydraulic actuators 14, 15, 46L, 46R, and 52, fluid passage(s), a tank, and/or the like. The main pump P1 and the pilot pump P2 are driven by power from a prime mover 9 to deliver hydraulic fluid sucked from the tank to fluid passage(s). The prime mover 9 includes, for example, an engine. For another example, the prime mover 9 may include an electric motor.

The main pump P1 is a variable displacement hydraulic pump. The regulator 42 changes the angle of the swash plate of the main pump P1. The controller 21 controls the opening of the proportional valve 41 to apply pilot pressure, which is the hydraulic pressure of hydraulic fluid delivered by the pilot pump P2, to the regulator 42. The controller 21 then actuates the regulator 42 to change the angle of the swash plate of the main pump P1 to change the amount of hydraulic fluid delivered by the main pump P1. Operating equipment 47 includes the travel operator 6 and work operator 7, operating valves corresponding to the travel operator 6 and the work operator 7, switching valve(s), and the like.

The control valve unit 40 is connected to the main pump P1 through a fluid supply passage 60. The control valve unit 40 is connected to the arm cylinders 14, the front cylinders 15, the latch cylinder 52 of the quick hitch 16, and the hydraulic fluid outlet port 18*a* through fluid passages. In particular, the control valve unit 40 is connected to the arm cylinders 14 and the front cylinders 15 through pairs of fluid supply-discharge passages 61. Note that in the following description, the pair of fluid supply-discharge passages 61*a* connecting the control valve unit 40 and the arm cylinders 14 is referred to as "first fluid supply-discharge passages", and that the pair of fluid supply-discharge passages 61*b* connecting the control valve unit 40 and the front cylinders 15 is referred to as "second fluid supply-discharge passages". The pair of first fluid supply-discharge passages 61*a* are connected to the first ports 67*a* and the second ports 67*b* of the arm cylinders 14. The second fluid supply-discharge passages 61*b* are connected to the first ports 67*a* and the second ports 67*b* of the front cylinders 15.

The control valve unit 40 allows hydraulic fluid supplied from the main pump P1 through fluid supply passage(s) 60 to flow to the arm cylinders 14 and the front cylinders 15 of the working device 4, the latch cylinder 52 of the quick hitch 16, and the hydraulic fluid outlet port 18*a*. The control valve unit 40 also allows hydraulic fluid that flows from the arm cylinders 14, the front cylinders 15, the latch cylinder 52, and the hydraulic fluid inlet port 18*b* (return fluid) to be discharged. The control valve unit 40 controls the direction and amount of supply of hydraulic fluid to the arm cylinders 14, the front cylinders 15, and the latch cylinder 52. The control valve unit 40 also controls the amount of supply of hydraulic fluid to the hydraulic fluid outlet port 18*a*.

Specifically, the control valve unit 40 includes control valves 40*a*, 40*b*, 40*c*, and 40*d* corresponding to the arm cylinders 14, the front cylinders 15, the latch cylinder 52, and the ports 18*a* and 18*b*. Each of the control valves 40*a*, 40*b*, 40*c*, and 40*d* is switchable between a neutral position, a first position, and a second position. At least the control valves 40*c* and 40*d* of the control valves 40*a*, 40*b*, 40*c*, and 40*d* are electrically actuated. The control valves 40*a*, 40*b*, 40*c*, and 40*d* are normally held in the neutral position by the elastic force of a spring.

The operating valve(s) of the operating equipment 47 and/or the like that correspond to the work operator 7 are actuated according to the manner in which the work operator 7 is operated, thus allowing the pilot pressure of pilot fluid from the pilot pump P2 to act on pressure receiver(s) of the control valve(s) 40*a* and/or 40*b*. For example, the work operator 7 may be supported on operating valves of the operating equipment 47 and the operating valves may be physically actuated by operation of the work operator 7. Additionally or alternatively, a detection sensor to detect the amount (degree) and direction of operation of the work operator 7 may be provided and the controller 21 may electrically actuate the operating valve(s) based on the detection result from the detection sensor. With this, the control valve(s) 40*a* and/or 40*b* is/are switched from the neutral position to the first position or the second position, so that hydraulic fluid from the main pump P1 is supplied through the control valve(s) 40*a* and/or 40*b* to the arm cylinders 14 and/or the front cylinders 15 to cause the arm cylinders 14 and/or the front cylinders 15 to extend or retract. It follows that the arms 11 and/or the attachment 30 such as the bucket 30*a* attached to the quick hitch 16 swing.

While the attaching switch 26 is being operated, the controller 21 places the control valve 40*c* in the first position to allow hydraulic fluid from the main pump P1 to be supplied to the latch cylinder 52 in the first direction to cause the latch cylinder 52 to extend. Accordingly, the operation of the attaching switch 26 that lasts for a first predetermined period of time T1 or more while the latching mechanisms 51 are in the unlatching state causes the latch cylinder 52 to extend to the predetermined degree or more, bringing the latching mechanisms 51 into the latching state. Even if the attaching switch 26 is operated, provided that the operation only lasts for a period less than the first predetermined period of time T1, the latch cylinder 52 does not extend to the predetermined degree or more and therefore the latching mechanisms 51 are not brought into the latching state. Therefore, the latching mechanisms 51 are moved back by the spring back force of the coil springs 56 to the original unlatching state.

On the contrary, while the detaching switch 27 is being operated, the controller 21 places the control valve 40*c* in the second position to allow hydraulic fluid from the main pump P1 to be supplied to the latch cylinder 52 in a second direction opposite to the first direction to cause the latch cylinder 52 to retract. Accordingly, the operation of the detaching switch 27 that lasts for a second predetermined period of time T2 or more while the latching mechanisms 51 are in the latching state causes the latch cylinder 52 to retract to a predetermined degree or more, bringing the latching mechanisms 51 into the unlatching state. Even if the detaching switch 27 is operated, provided that the operation only lasts for a period less than the second predetermined period of time T2, the latch cylinder 52 does not retract to the predetermined degree or more and therefore the latching mechanisms 51 are not brought into the unlatching state. Therefore, the latching mechanisms 51 are moved back by the spring back force of the coil springs 56 to the original latching state.

The first predetermined period of time T1 and the second predetermined period of time T2 are each, for example, about 2 to 3 seconds. The first predetermined period of time T1 and the second predetermined period of time T2 may be the same period or different periods. The specific values of the first predetermined period of time T1 and the second predetermined period of time T2 are examples, and not limited to the values above. The same applies to a third predetermined period of time T3 and a period of time T4 (described later).

The following discusses a process of attaching an attachment 30. When an attachment 30 placed on the ground or the like is to be attached to the working vehicle 1, the user of the working vehicle 1 operates the traveling device 5 and/or the working device 4 using the manual operator(s) 6 and/or 7 to allow the front plates 50*f* of the brackets 50 of the quick hitch 16 to engage with the base plate 71 of the attachment 30, thus holding the attachment 30 with the brackets 50 (see FIG. 3A). In so doing, in some cases, the user allows the front plates 50*f* to engage with the base plate 71 and then allow the arms 11 and/or the quick hitch 16 to swing upward by a predetermined angle using the work operator 7 to raise the attachment 30 with the working device 4 to some extent to check whether the attachment 30 is held by the brackets 50.

Then, if the user operates the attaching switch 26 for the first predetermined period of time T1 or more, the controller 21 causes the latch cylinder 52 to extend. With this, the latch levers 57 pivot downward, so that the latch pins 54 are inserted into the through-holes 71*h* of the base plate 71 of the attachment 30 to allow the attachment 30 to be latched by the latching mechanisms 51 (see FIG. 3B). That is, the attachment 30 is brought into a state in which it is attached to the quick hitch 16 and the working vehicle 1.

When the auxiliary mode switch 28 is operated and the auxiliary mode is selected, a specific attachment 30 is attached to the quick hitch 16. The hydraulic fluid outlet port 18*a* and a hydraulic fluid inlet port 38*b* of the specific attachment 30*b* are connected together by a hose, and the hydraulic fluid inlet port 18*b* and a hydraulic fluid outlet port 38*a* of the specific attachment 30*b* are connected together by a hose.

Upon operation of the auxiliary output switch 29 under such circumstances, the controller 21 switches the control valve 40*d* from the neutral position to the first position or the second position. With this, hydraulic fluid from the main pump P1 is supplied (transmitted) through a fluid passage 45*a* to the hydraulic fluid outlet port 18*a*, and hydraulic fluid flowing into a fluid passage 45*b* from the hydraulic fluid inlet port 18*b* is drained through the control valve unit 40.

With this, hydraulic fluid discharged through the hydraulic fluid outlet port 18*a* is introduced into the specific attachment 30*b* through the hydraulic fluid inlet port 38*b* via a hose or the like. Furthermore, hydraulic fluid (return fluid) discharged through the hydraulic fluid outlet port 38*a* of the specific attachment 30*b* is introduced through the hydraulic fluid inlet port 18*b* via a hose or the like and is drained from the control valve unit 40. Since hydraulic fluid is introduced and discharged to and from the specific attachment 30*b* as such, hydraulic actuators 36 such as a hydraulic motor and/or hydraulic cylinder(s) of the attachment 30*b* are actuated, making it possible to perform work using the attachment 30*b*.

When allowing hydraulic fluid to be introduced and discharged to and from the specific attachment 30*b*, the controller 21 changes the opening of the control valve 40*d* depending on what specific attachment 30*b* is attached to the quick hitch 16, to adjust the flow rate or hydraulic pressure of hydraulic fluid supplied to the hydraulic fluid outlet port 18*a*. For example, the controller 21 may cause the flow rate sensor 43 to detect the flow rate of hydraulic fluid flowing through the fluid passage 45*a* and control the opening of the control valve 40*d*. Additionally or alternatively, the controller 21 may cause the pressure sensor 44 to detect the hydraulic pressure of hydraulic pressure flowing through the fluid passage 45*a* and control the opening of the control valve 40*d*.

The pair of left and right traveling devices 5 include a pair of left and right hydro-static transmissions (HSTs) 46L and 46R corresponding to the pair of left and right traveling devices 5. Each of the HSTs 46L and 46R includes hydraulic pump(s) and a travel motor (hydraulic motor).

The operating valve(s) of the operating equipment 47 and/or the like that correspond to the travel operator 6 are actuated according to the manner in which the travel operator 6 is operated, thus allowing the pilot pressure of pilot fluid from the pilot pump P2 to act on pressure receiver(s) of the swash plate(s) of the hydraulic pump(s) of the corresponding HST(s) 46L and/or 46R and changing the angle of inclination of the swash plate(s). For example, the travel operator 6 may be supported on the operating valves of the operating equipment 47 and the operating valves may be physically actuated by operation of the travel operator 6. Additionally or alternatively, a detection sensor to detect the amount (degree) and direction of operation of the travel operator 6 may be provided and the controller 21 may electrically actuate the operating valve(s) based on the detection result from the detection sensor. This controls the supply, the stopping of supply, and the direction of supply of hydraulic fluid from the hydraulic pump(s) of the HSTs 46L and/or 46R to the travel motor(s), the travel motor(s) rotate (s) in the forward direction, rotate in the reverse direction, or stop, the left and/or right traveling device(s) 5 also rotate(s) in the forward direction, rotate in the reverse direction, or stop, and the working vehicle 1 travels forward, rearward, turn left or right, or stops.

Furthermore, switching valve(s) for speed changes of the operating equipment 47 and/or like switch(es) positions according to control signal(s) from the controller 21, thus changing the angle of inclination of the swash plate(s) of the travel motor(s) of the HSTs 46L and/or 46R. With this, the rotation speed of the travel motor(s) increases or decreases, so that the travel speed of the traveling devices 5 and the working vehicle 1 is changed.

The controller 21 selects (determines, recognizes) the identification information (attachment ID) of the attachment 30 attached to the linkage (quick hitch) 16, and starts a predetermined process based on the selected attachment ID. Specifically, the controller 21 recognizes the specifications and the like of the attachment 30 attached to the quick hitch 16 based on the selected attachment ID, and starts a predetermined process based on the attachment ID.

The following discusses in more detail the process performed by the controller 21 to select the attachment ID of the attachment 30 attached to the quick hitch 16 (such a process is hereinafter referred to as a securing-of-attachment recognizing process). The controller 21 performs the securing-of-attachment recognizing process based on the pressure of hydraulic fluid supplied to the hydraulic actuator(s) AC (such a pressure is hereinafter referred to as a supply pressure).

In the present example embodiment, the working vehicle 1 includes an input 80 to receive input of information differing from the supply pressure, and the controller 21 performs a securing-of-attachment recognizing process based on the supply pressure in addition to the input information. The securing-of-attachment recognizing process performed by the controller 21 includes, for example, a first process in which the controller 21 provisionally selects a candidate for the attachment ID corresponding to the attachment 30 attached to the quick hitch 16, and a second process in which the controller 21 determines whether the attachment 30 corresponding to the candidate for the attachment ID selected in the first process (such an attachment 30 is hereinafter referred to as a candidate attachment) is the attachment 30 attached to the quick hitch 16.

The controller 21 performs a first process in which the controller 21 provisionally selects a candidate for the attachment ID based on the input information. On the other hand, the controller 21 performs a second process in which the controller 21 determines whether the candidate attachment is the attachment 30 attached to the quick hitch 16 based on the supply pressure. Then, if the controller 21 determines in the second process that the candidate attachment provisionally selected in the first process is the attachment 30 attached to the quick hitch 16, the controller 21 selects the provisionally selected candidate for the attachment ID. With this, the controller 21 identifies (recognizes) the attachment 30 attached to the quick hitch 16.

The input 80 includes, for example, a user interface 25 to receive input of information (input information) indicating the attachment 30. The user interface 25 allows the selection of information indicating one of a plurality of attachments 30 attachable to the quick hitch 16, and receives input of the selected information as the input information. In such a case, the controller 21 performs the securing-of-attachment recognizing process based on the information indicating the attachment 30 selected via the user interface 25 and based on the supply pressure. That is, in the case where the input 80 includes the user interface 25, the controller 21 performs a first process using the information indicating the attachment 30 selected via the user interface 25, in which a candidate for the attachment ID is provisionally selected manually.

The input 80 may include a receiver (beacon scanner) 23 in addition to or instead of the user interface 25. In such a case, the controller 21 performs the securing-of-attachment recognizing process to select an attachment ID from the attachment ID(s) included in one or more wireless signals Q1 received by the beacon scanner 23, based on the wireless signal(s) Q1 and the supply pressure. The controller 21 selects the attachment ID attached to the quick hitch 16 based on the received signal strength(s) (RSSI(s)) of the wireless signal(s) Q1 and the supply pressure. In the case where the input 80 includes the beacon scanner 23, the controller 21 performs a first process based on the received signal strength(s), in which the controller 21 provisionally selects a candidate for the attachment ID automatically.

The following description discusses an example case in which the input 80 includes both the user interface 25 and the beacon scanner 23, but the input 80 may be either one of the user interface 25 and the beacon scanner 23. In the case where the input 80 includes both the user interface 25 and the beacon scanner 23, in the attachment usage system 100, the manual selection mode and the automatic selection mode can be switched by, for example, the driver or the like performing a predetermined operation on the user interface 25.

The manual selection mode is a mode in which the controller 21 performs a first process to provisionally select candidate(s) for the attachment ID based on the information indicating the attachment 30 received via the user interface 25, and performs a second process to start a predetermined process based on the selected attachment ID. That is, in the manual selection mode, for example, the user of the working vehicle 1 inputs information relating to the attachment 30 attached to the quick hitch 16 via the user interface 25. In the manual selection mode, the controller 21 identifies the attachment 30 attached to the quick hitch 16 based on the information relating to the attachment 30 inputted via the user interface 25.

Specifically, the user interface 25 displays an attachment list L1 indicating a plurality of attachment 30 attachable to the quick hitch 16. FIG. 5 is a diagram showing an example of the attachment list L1. The data of the attachment list L1 is stored in the storing device 22. The attachment list L1 displayed by the user interface 25 includes, for example, pieces of attachment information including the names, attachment IDs, the specifications and/or the like of a plurality of attachment 30 attachable to the quick hitch 16.

When the driver or the like selects the piece of attachment information indicating the attachment 30 attached to the quick hitch 16 from the attachment list L1 via the user interface 25, the controller 21 provisionally selects a candidate for the attachment ID of the attachment 30 attached to the quick hitch 16 based on the selected piece of attachment information.

Note that the examples mentioned above describe cases where the user interface 25 displays the attachment list L1 and the controller 21 provisionally selects a candidate for the attachment ID based on the selected piece of attachment information, but the information displayed by the user interface 25 is not limited to the attachment list L1. For example, instead of displaying the attachment list L1, the user interface 25 may display the icons (symbols) of a plurality of attachments 30 attachable to the quick hitch 16. In such a case, when the driver or the like selects (designates) one of the icons via the user interface 25, the controller 21 provisionally selects a candidate for the attachment ID of the attachment 30 corresponding to the selected icon.

Instead of displaying the attachment list L1, the user interface 25 may display the input screen for attachment information such as the attachment ID(s). In this case, when the driver or the like inputs a piece of attachment information relating to the attachment 30 attached to the quick hitch 16 on the input screen via the user interface 25, the controller 21 provisionally selects a candidate for the attachment ID of the attachment 30 attached to the quick hitch 16 based on the inputted piece of attachment information.

The automatic selection mode is a mode in which the controller 21 performs a first process to provisionally select candidate(s) for the attachment ID of the attachment 30 attached to the quick hitch 16 from the attachment ID(s) stored in the internal memory 21*a* and performs a second process to start a predetermined process based on the selected attachment ID. In the automatic selection mode, the controller 21 performs the first and second processes to identify the attachment 30 attached to the quick hitch 16 using the attachment ID selected based on a predetermined condition from the attachment ID(s) stored in the internal memory 21*a*.

The following details the first process which is based on transmitter(s) 33 and wireless signal(s) Q1. The transmitter 33 is a beacon transmitter to periodically transmit a wireless signal Q1 compliant with a near field communication standard. Specifically, the beacon transmitter 33 is a device to periodically transmit an advertisement signal Q1 which is a wireless signal Q1 compliant with Bluetooth (registered trademark) Low Energy. The beacon transmitter 33 looks like a small tag, and is therefore sometimes called a "BLE tag". The beacon transmitter 33 includes a microcomputer, a memory, a transmitter circuit, a battery, a vibration sensor 34, and/or the like. The elements of the beacon transmitter 33 are driven by electricity from the battery. The beacon transmitter 33 transmits the advertisement signal Q1 at interval(s) of, for example, about 1 second to about 3 seconds, but the intervals are not limited to 1 second to 3 seconds and may be selected as appropriate.

Figure 6:
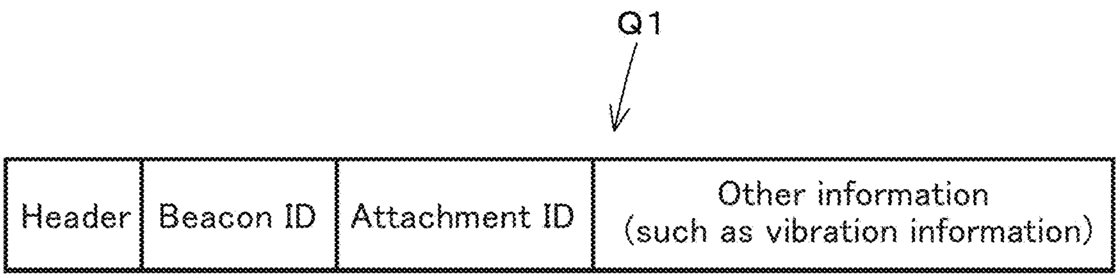
FIG. 6 is a diagram showing an example of information included in an advertisement signal.

FIG. 6 shows an example of information contained in an advertisement signal Q1 transmitted from the beacon transmitter 33. The advertisement signal Q1 includes a header, a beacon ID (tag serial number), an attachment ID, and other information.

The beacon ID is identification information of the beacon transmitter 33 which is the sender of the advertisement signal Q1. The attachment ID is identification information of the attachment 30 in or on which the beacon transmitter 33 which is the sender of the advertisement signal Q1 is provided.

The other information in the advertisement signal Q1 includes vibration information relating to the vibration state detected by the vibration sensor 34 of the beacon transmitter 33 which is the sender, i.e., vibration information relating to the vibration state of the attachment 30 in or on which the beacon transmitter 33 is provided. The vibration information may include information such as a message indicating whether or not the attachment 30 is vibrating (presence or absence of vibration). The vibration information may include, instead of or in addition to the information such as a message, a vibration indicator (numerical value) indicating the magnitude of vibration detected by the vibration sensor 34. The vibration indicator may be, for example, at least one of the displacement, velocity, or acceleration of vibrations of the attachment 30 detected by the vibration sensor 34. Inertial sensor(s) such as an acceleration sensor and/or a gyroscope sensor may be used as the vibration sensor 34.

Note that examples of other information included in the advertisement signal Q1, other than the vibration information, include the supply amount and the supply pressure of hydraulic fluid to the attachment 30, the name (official name) of the attachment 30, the remaining battery level of the beacon transmitter 33, and the acting time (hour meter) of the attachment 30 having the beacon transmitter 33 attached thereto.

As illustrated in FIG. 1, the beacon transmitter 33 is located on, for example, the back surface of the attachment 30 that faces the machine body 2 of the working vehicle 1. The beacon scanner 23 is located at, for example, the front portion of the machine body 2 that faces the attachment 30. The controller 21 is provided in the machine body 2. Since the beacon scanner 23 is provided in or on the machine body 2, it is possible to achieve a configuration in which output signals from the beacon scanner 23 can be inputted into the controller 21 using simple electric wiring or simple communication circuit(s) as compared to cases where the beacon scanner 23 is provided on the movable working device 4.

The advertisement signal Q1 transmitted from the beacon transmitter 33 is received by the beacon scanner 23 of the working vehicle 1. The controller 21 identifies (recognizes) the attachment 30 based on the attachment ID included in the advertisement signal Q1 received by the beacon scanner 23. In the case where one or more attachments 30 are present in the vicinity of the working vehicle 1, one or more advertisement signals Q1 from one or more beacon transmitters 33 of the one or more attachments 30 are received by the beacon scanner 23. Upon receipt of each advertisement signal Q1, the beacon scanner 23 measures the RSSI of the advertisement signal Q1.

The controller 21 reads the one or more attachment IDs from the one or more advertisement signals Q1 received by the beacon scanner 23. The controller 21 then causes the internal memory (first memory) 21*a* to store the one or more attachment IDs read from the one or more advertisement signals Q1 and RSSI(s) such that the attachment ID(s) and the RSSI(s) are associated with each other for a period of time T4, so that attachment IDs are collected in the internal memory 21*a*.

In the present example embodiment, the controller 21 collects attachment IDs and RSSIs satisfying a predetermined selection condition in the internal memory 21*a*. The selection condition includes, for example, whether the RSSI is equal to or higher than a predetermined value (first selection condition), whether the attachment 30 is vibrating or not (second selection condition), and/or the like.

If the acquired RSSI is higher than a predetermined value (first predetermined value) X, the controller 21 determines that the first selection condition is satisfied. If vibration information indicating that the attachment 30 is vibrating is included in the information read from the advertisement signal Q1, the controller 21 determines that there is vibration on the attachment 30 and that the second selection condition is satisfied. If a vibration indicator is included in the information read from the advertisement signal Q1 and the vibration indicator is greater than a predetermined value (second predetermined value) Y, the controller 21 determines that there is vibration on the attachment 30 and that the second selection condition is satisfied.

When the attachment 30 is attached to the quick hitch 16, the controller 21 performs a first process in which the controller 21 provisionally selects a candidate for the ID of the attachment 30 attached to the quick hitch 16 from the attachment ID(s) stored in the internal memory 21*a* based on the RSSI. Specifically, the controller 21 performs the first process in which the controller 21 provisionally selects, as a candidate, the attachment ID corresponding to the highest RSSI from the attachment ID(s) stored in the internal memory 21*a*.

The one of the one or more advertisement signals Q1 received by the beacon scanner 23 that has the highest RSSI is a signal transmitted from the beacon transmitter 33 located closest to the beacon scanner 23. Therefore, the controller 21 regards, as the attachment ID of the attachment 30 attached to the quick hitch 16, the attachment ID included in an advertisement signal Q1 having the highest RSSI of advertisement signals Q1 received by the beacon scanner 23 during the period of time T4 which ended when the attachment 30 was attached to the quick hitch 16, and provisionally selects that attachment ID.

The attachment ID corresponding to the highest RSSI as described above is a predetermined condition based on which one of attachment ID(s) collected in the internal memory 21*a* is to be selected. Note that the RSSIs stored in the internal memory 21*a* may include one or more highest RSSIs. If a plurality of the highest RSSIs are stored in the internal memory 21*a*, such RSSIs have the same value and correspond to the same attachment ID. Therefore, the controller 21 may provisionally select one of the same attachment IDs (for example, the attachment ID corresponding to the latest receipt time).

The controller 21 selects an attachment ID based on the supply pressure obtained when the attachment 30 is caused to be out of contact with a contact surface (for example, the top surface of the ground of an agricultural field, a barn, or the like, or the top face of a mount on which the attachment 30 is placed) by the lifter C. The controller 21 selects an attachment ID based on the supply pressure obtained when the operation actuator 26 is operated to attach the attachment 30 to the quick hitch 16. Specifically, the controller 21 acquires the supply pressure obtained when the quick hitch 16 is switched from the first mode to the second mode to attach the attachment 30 thereto by the operation of the operation actuator (attaching switch) 26.

In the present example embodiment, the controller 21 acquires the supply pressure obtained when an operation to switch the quick hitch 16 from the first mode to the second mode has been performed and the attachment 30 is caused to be out of contact with the contact surface and maintained at a predetermined height by the lifter C. Thus, the controller 21 in the present example embodiment acquires the supply pressure obtained when the following conditions are satisfied: an operation to switch the quick hitch 16 from the first mode to the second mode has been performed (first acquisition condition); the attachment 30 is caused to be out of contact with the contact surface by the lifter C (second acquisition condition); and the attachment 30 is maintained at a predetermined height (third acquisition condition).

The controller 21, for example, acquires an operation signal from the attaching switch 26 and determines whether or not the first acquisition condition is satisfied. Specifically, when the controller 21 determines that the attaching switch 26 has been operated continuously for a first predetermined period of time T1 or more based on the operation signal from the attaching switch 26, the controller 21 determines that the first acquisition condition is satisfied.

As described earlier, when the driver attaches the attachment 30 to the quick hitch 16, the driver slightly lifts the attachment 30 with the working device 4 to determine that the attachment 30 is held by the brackets 50. It therefore can be said that when the attachment 30 is attached to the quick hitch 16, i.e., when the attaching switch 26 is operated, the attachment 30 is brought out of contact with the contact surface. Therefore, the controller 21 can determine whether the first acquisition condition is satisfied and whether the second acquisition condition is satisfied by performing a single determination.

The controller 21 determines whether or not the third acquisition condition is satisfied based on, for example, the operation of the work operator 7 (pilot pressure from the operating valve(s) and/or detection signal(s) from detection sensor(s)). That is, the controller 21 may determine that the lifter C is not in action and the third acquisition condition is satisfied when the operator 7 is not operated.

Note that the above-described methods of determining whether the first to third acquisition conditions are satisfied are merely examples, and that this does not imply any limitation. For example, potentiometer(s) may be provided on the shaft(s) 11*a* at the proximal portion(s) of the arm(s)

11 and/or on the shaft(s) 16*a* at the proximal portion(s) of the quick hitch 16, stroke sensor(s) may be provided on the arm cylinder(s) 14 and/or the front cylinder(s) 15, and/or acceleration sensor(s) may be provided on the arm(s) 11 and/or the quick hitch 16, and the controller 21 may determine whether each of the acquisition conditions is satisfied based on the detection results from such elements.

The controller 21 acquires the supply pressure at at least one of the first port(s) 67*a* or the second port(s) 67*b* of the hydraulic cylinder(s) 14 and/or 15. In the present example embodiment, since the working vehicle 1 includes the arm cylinders 14 and the front cylinders 15, the controller 21 acquires the supply pressure of fluid supplied to the arm cylinder(s) 14 (first supply pressure) and/or the supply pressure of fluid supplied to the front cylinder(s) 15 (second supply pressure). The following describes an example case in which the controller 21 acquires the first supply pressure and the second supply pressure and the controller 21 selects an attachment ID based on the first supply pressure and the second supply pressure.

As shown in FIG. 4, a hydraulic system of the working vehicle 1 includes pressure detector(s) 62. Each pressor detector 62 is a device (sensor) to detect the supply pressure of fluid supplied to a hydraulic actuator AC (hydraulic cylinder 14, 15). The pressure detector 62 is electrically connected to the controller 21, and outputs a detection signal to the controller 21 indicating the detected supply pressure. The pressure detector 62 is provided such that the pressure detector 62 corresponds to a supply pressure acquired by the controller 21. In the present example embodiment, the pressure detector(s) 62 include first pressure detector(s) 62*a* to detect the first supply pressure, and second pressure detector(s) 62*b* to detect the second supply pressure.

The first pressure detector(s) 62*a* detect(s) the supply pressure at arm cylinder(s) 14 (first supply pressure). The second pressure detector(s) 62*b* detect(s) the supply pressure at front cylinder(s) 15 (second supply pressure). As described earlier, the arm cylinder 14 and the front cylinder 15 are double-acting hydraulic cylinders, and each include a first port 67*a* and a second port 67*b* via which hydraulic fluid comes in and out. Therefore, the first pressure detectors 62*a* are connected to the respective pair of first fluid supply-discharge passages 61*a* which are fluid passages (pipes) connected to the first ports 67*a* and the second ports 67*b* of the arm cylinders 14. The second pressure detectors 62*b* are connected to the respective pair of second fluid supply-discharge passages 61*b* which are fluid passages (pipes) connected to the first ports 67*a* and the second ports 67*b* of the arm cylinders 15.

In the present example embodiment, the pair of first pressure detectors 62*a* are located at the portions of the pair of first fluid supply-discharge passages 61*a* that are in the vicinity of the first ports 67*a* and the second ports 67*b* of the arm cylinders 14. The pair of second pressure detectors 62*b* are located at the portions of the pair of second supply-discharge passages 61*b* that are in the vicinity of the first ports 67*a* and the second ports 67*b* of the front cylinders 15.

With this, the pair of first pressure detectors 62*a* are able to detect the first supply pressure at the first ports 67*a* of the arm cylinders 14 and the first supply pressure at the second ports 67*b* of the arm cylinders 14. The pair of second pressure detector 62*b* are able to detect the second supply pressure at the first ports 67*a* of the front cylinders 15 and the second supply pressure at the second ports 67*b* of the front cylinders 15. That is, the first pressure detectors 62*a* and the second pressure detectors 62*b* are able to detect supply pressures (the supply pressures at the two internal spaces separated by the piston 66*a*) in the tubular cylinders 65 of the hydraulic cylinders 14 and 15.

When the attachment 30 is brought out of contact with the contact surface by the driver or the like operating the work operator 7, the force of gravity resulting from the mass of at least the attachment 30, the quick hitch 16 and the arms 11 acts on the arm cylinders 14 through the quick hitch 16 and the arms 11. On the other hand, the force of gravity resulting from at least the mass of the attachment 30 and the quick hitch 16 acts on the front cylinders 15 through the quick hitch 16.

Accordingly, when the attachment 30 is brought out of contact with the contact surface, the force of gravity resulting from at least the mass of the attachment 30 acts on the arm cylinders 14 and the front cylinders 15 (such a force of gravity is referred to as attachment gravity). In such a case, the arm cylinders 14 are caused to retract due to the attachment gravity. The front cylinders 15 are caused to extend due to the attachment gravity.

With this, as the attachment 30 is caused to descend due to the gravity, the detection results regarding the supply pressures from the first pressure detectors 62*a* and the second detectors 62*b* also change (the supply pressures increase).

Specifically, in each arm cylinder 14, an end of the rod 66*b* is connected to a corresponding arm 11 and an end of the tubular cylinder 65 is connected to the frame chassis, and therefore, when the attachment 30 is brought out of contact with the contact surface and the attachment gravity acts on the arm 11, the force is transmitted to the rod 66*b* such that the rod 66*b* moves toward the end of the tubular cylinder.

For this reason, in the arm cylinder 14, the pressure of hydraulic fluid at the second port 67*b* increases because of the force of gravity that acts through the quick hitch 16 and the arm 11 and the force to push hydraulic fluid out through the first port 67*a*. The hydraulic fluid at the first port 67*a* side of the tubular cylinder 65 is discharged through the first port 67*a* by the piston 66*a* which receives the pressure of hydraulic fluid at the second port 67*b* side of the tubular cylinder 65. With this, the pressure of hydraulic fluid at the first port 67*a* side (pressure change) and the pressure of hydraulic fluid at the second port 67*b* side (pressure change) correspond to each other (follow each other).

On the other hand, in each front cylinder 15, an end of the rod 66*b* is connected to the quick hitch 16 and an end of the tubular cylinder 65 is connected to a corresponding arm 11, and therefore, when the attachment 30 is brought out of contact with the contact surface and the attachment gravity acts on the quick hitch 16, the force is transmitted to the rod 66*b* such that the rod 66*b* moves in a direction opposite to the end of the tubular cylinder. For this reason, in the front cylinder 15, the pressure of hydraulic fluid at the first port 67*a* side increases because of the gravity which acts via the quick hitch 16 and the force to push hydraulic fluid out through the second port 67*b*. The hydraulic fluid at the second port 67*b* side of the tubular cylinder 65 is discharged through the second port 67*b* by the piston 66*a* which receives the pressure of hydraulic fluid at the first port 67*a* side of the tubular cylinder 65. With this, the pressure of hydraulic fluid (pressure change) at the first port 67*a* side and the pressure of hydraulic fluid (pressure change) at the second port 67*b* side correspond to each other each other (follow each other).

In such a manner, the supply pressure changes depending on the mass of the attachment 30, i.e., depending on the magnitude of the attachment gravity.

The controller 21 calculates predetermined information-for-determination, based on detection signal(s) output from the pressure detector(s) 62. The information-for-determination is information corresponding to the supply pressure (first supply pressure and/or second supply pressure). In the present example embodiment, the information-for-determination corresponds to the first supply pressure and the second supply pressure because the controller 21 selects an attachment ID based on the first supply pressure and the second supply pressure.

The information-for-determination includes, for example, detection signal(s) output from pressure detector(s) 62 (for example, electric current value(s)). The information-for-determination includes a first value-for-determination which is outputted from the first pressure detector(s) 62*a* and corresponds to the first supply pressure, and a second value-for-determination which is outputted from the second pressure detector(s) 62*b* and corresponds to the second supply pressure.

The information-for-determination may include, for example, a value obtained by converting detection signal(s) outputted from the pressure detector(s) 62 into supply pressure. In such a case, the first value-for-determination is the first supply pressure based on the detection signal(s) outputted from the first pressure detector(s) 62*a*, and the second value-for-determination is the second supply pressure based on the detection signal(s) outputted from the second pressure detector(s) 62*b*.

The information-for-determination may include a value obtained by converting detection signal(s) output from the pressure detector(s) 62 into supply pressure and converting the supply pressure using a predetermined arithmetic expression. For example, the controller 21 converts the supply pressure into the thrust force of the hydraulic cylinder(s) 14 and/or 15 using an arithmetic expression based on Pascal's principle. In such a case, the first value-for-determination is the thrust force (first thrust force) of the arm cylinder(s) 14 based on the first supply pressure. Also, the second value-for-determination is the thrust force (second thrust force) of the front cylinder(s) 15 based on the second supply pressure.

Note that, in each of the hydraulic cylinders 14 and 15 of the present example embodiment, since there is no piston rod 66 (rod 66*b*) in the internal space (first fluid chamber 68*a*) at the first port 67*a* side of the tubular cylinder 65, the pressure of hydraulic fluid at the second port 67*b* side is higher than the pressure of hydraulic fluid at the first port 67*a* side. However, in each of the hydraulic cylinders 14 and 15, as described above, the pressure of hydraulic fluid at the first port 67*a* side and the pressure of hydraulic fluid at the second port 67*b* side are correlated with each other. Therefore, the controller 21 calculates the thrust force (first thrust force and second thrust force) based on the relationship between the pressures of hydraulic fluid. It is noted here that, in calculating the thrust force (first thrust force, second thrust force) of the piston rods 66, the controller 21 may correct value(s) in consideration of the sliding resistance of the piston(s) 66*a* sliding in the tubular cylinder(s) 65.

The information-for-determination may include a value obtained by calculating the thrust force of the hydraulic cylinder(s) 14, 15 and converting the thrust force using a predetermined arithmetic expression. For example, the controller 21 may calculate weight information and dimension information based on the calculated thrust force (in other words, the supply pressure obtained when the attachment 30 is attached to the quick hitch 16), and perform a securing-of-attachment recognizing process based on the calculated weight information and dimension information.

The weight information relates to the weight of the attachment 30 attached to the quick hitch 16, and is calculated based on the first thrust force, i.e., based on the first supply pressure. The controller 21 calculates the weight information from the first thrust force. In the present example embodiment, the weight information is the force in a vertical direction (attachment gravity) in the vicinity of the attachment 30. Specifically, the arithmetic expression by which the controller 21 converts the first thrust force into a vertical force is defined based on the dimension information about the arm(s) 11 (for example, the dimension of an arm 11 from the shaft 11*a* at the proximal portion to the shaft 16*a* at the distal portion, the dimension from the shaft 11*a* at the proximal portion of the arm 11 to the shaft 14*a* at the first end of the arm cylinder 14, and/or the like), the mass of the lifter C, and/or the like. Examples of variable(s) included in the arithmetic expression include the dimension information about the arms 11, the angle of rotation of the arms 11, and the angle of rotation of the arm cylinders 14.

Note that the angle of rotation of the arm(s) 11 is detected by the potentiometer(s) located on the shaft 11*a* at the proximal portion of the arm(s) 11 and/or by the acceleration sensor(s) located on the arms 11, and the controller 21 acquires the angle of rotation of the arms 11 based on the detection result(s). The angle of rotation of the arm cylinder(s) 14 is detected by the potentiometer(s) located on the shaft 14*b* of the proximal portion of the arm cylinder(s) 14 and/or by the acceleration sensor(s) located on the arm cylinder(s) 14, and the controller 21 acquires the angle of rotation of the arm cylinder(s) 14 based on the detection result(s).

Note that the above arithmetic expression is an example, and the arithmetic expression may include not only the dimension information of the arms 11, the mass of the lifter C, the angle of rotation of the arms 11 and the angle of rotation of the arm cylinders 14, but also the dimension information about the quick hitch 16 (the dimension from the shaft 16*a* at the distal portion of the arms 11 to a certain position on the quick hitch 16, e.g., the shortest distance from the shaft 16*a* to the front surface of the front plate 50*f*) and/or the angle of rotation of the quick hitch 16.

The dimension information relates to the dimension of the attachment 30 that extends from the quick hitch 16 in the direction of extension of the attachment 30 attached to the quick hitch 16, and is calculated based on the second thrust force, in other words, based on the second supply pressure. The controller 21 calculates the dimension information based on the second thrust force and the weight information. In the present example embodiment, the dimension information indicates the dimension of the attachment 30 from the quick hitch 16 to the center of gravity of the attachment 30 or to the vicinity of the center of gravity, along the front-rear direction of the attachment 30. Specifically, the arithmetic expression by which the controller 21 converts the second thrust force and the weight information into the dimension information is defined based on the dimension information of the quick hitch 16 (the dimension from the shaft 16*a* at the distal portion of the arms 11 to a certain position on the quick hitch 16), the mass of the quick hitch 16, and/or the like. Examples of variable(s) included in the arithmetic expression include the angle of rotation of the quick hitch 16.

In the present example embodiment, the beacon transmitter 33 transmits an advertisement signal Q1 including a predetermined criterion, and the controller 21 selects an attachment ID corresponding to the criterion satisfied by the information-for-determination. Note that the controller 21 reads each criterion from the advertisement signal Q1, and causes the internal memory (first memory) 21*a* to store the criterion together with the attachment ID and the RSSI for a period of time T4. Thus, in the present example embodiment, criteria are collected in the internal memory 21*a* such that the criteria are associated with attachment IDs and RSSIs.

The controller 21 refers to, in the internal memory 21*a*, the criterion corresponding to (associated with) the candidate for the attachment ID that the controller 21 provisionally selected in the first process, and determines whether the information-for-determination satisfies the criterion. If the controller 21 determines that the information-for-determination satisfies the criterion, the controller 21 selects the candidate for the attachment ID which was provisionally selected in the first process and its corresponding criterion is satisfied. On the other hand, if the controller 21 determines that the information-for-determination does not satisfy the criterion, the controller 21 does not select the candidate for the attachment ID provisionally selected in the first process.

The criterion is information defined corresponding to the information-for-determination. Specifically, in the case where the information-for-determination is a detection signal (electric current value) outputted from the pressure detector(s) 62, the criterion relates to the magnitude of the electric current value that the pressure detector(s) 62 detects when an attachment 30 is attached to the quick hitch 16 and caused to be out of contact with the contact surface by the lifter C. In the case where the information-for-determination is supply pressure, the criterion relates to the magnitude of the supply pressure obtained when an attachment 30 is attached to the quick hitch 16 and caused to be out of contact with the contact surface by the lifter C. In the case where the information-for-determination is thrust force, the criterion relates to the magnitude of the thrust force of the hydraulic cylinder(s) 14, 15 obtained when an attachment 30 is attached to the quick hitch 16 and caused to be out of contact with the contact surface by the lifter C. In the case where the information-for-determination is weight information, the criterion relates to the magnitude of the vertical force in the vicinity of an attachment 30 obtained when the attachment 30 is attached to the quick hitch 16 and caused to be out of contact with the contact surface by the lifter C. In the case where the information-for-determination is dimension information, the criterion relates to the dimension of the attachment 30 in the front-back direction. The criterion may be an ideal value defined by calculation, and may be defined based on detection signal(s) actually detected by the pressure detector(s) 62 when an attachment 30 is attached to the quick hitch 16. The criterion may be a range including a predetermined value. Furthermore, the criterion may be definable using a portable device 70 such as a smartphone.

Note that, although the above description discusses example cases in which the beacon transmitter 33 transmits an advertisement signal Q1 including a criterion, the storing device 22 may store in advance attachment IDs of a plurality of attachments 30 attachable to the quick hitch 16 and predetermined criterion (criteria) such that the attachment IDs are associated with the predetermined criterion (criteria). In such a case, the storing device 22 stores pieces of attachment information in the attachment list L and the criterion (criteria) such that the pieces of attachment information are associated with the criterion (criteria).

The controller 21 may select an attachment ID based on a plurality of the above mentioned pieces of information-for-determination, and may select an attachment ID based on a single piece of information-for-determination. For example, the controller 21 may select an attachment ID based on both the first supply pressure and the second supply pressure, or may select an attachment ID based on only one of them. Furthermore, the controller 21 may select an attachment ID based on both the weight information and the dimension information, or may select an attachment ID based on only one of them. The combination of such pieces of information-for-determination is not limited to the above mentioned examples.

The controller 21 compares the value of the information-for-determination with the criterion, and, if the information-for-determination satisfies the criterion, the controller 21 selects the candidate for the attachment ID provisionally selected in the first process. For example, if the controller 21 determines that the value of the information-for-determination satisfies the criterion, the controller 21 selects the candidate attachment ID provisionally selected in the first process. The controller 21 identifies the specifications and the like of the attachment 30 attached to the quick hitch 16 based on the selected attachment ID, and starts a predetermined process based on the attachment ID.

On the other hand, if the controller 21 determines that the value of the information-for-determination does not satisfy the criterion, the controller 21 does not select the candidate for the attachment ID provisionally selected in the first process. In the case where the controller 21 does not select the candidate for the attachment ID provisionally selected in the first process, the controller 21, for example, returns to the first process, and performs provisional selection of an attachment ID again. Specifically, in the case where the user interface 25 is included in the input 80, the user interface 25 displays in the attachment list L1 the attachment(s) 30 other than the attachment 30 which was not selected in the second process, and allows manual provisional selection of an attachment ID (allows reselection). That is, in such reselection, the user interface 25 displays the attachment list L1 which does not include the attachment 30 that was not selected in the second process. In so doing, the user interface 25 may display, in the attachment list L1, only the attachment(s) 30 that correspond(s) to the attachment ID(s) collected in the internal memory 21*a*.

Note that, in the case where the candidate for the attachment ID provisionally selected in the first process is not selected in the second process, the first process may be skipped and the attachment ID of the attachment 30 attached to the quick hitch 16 may be selected based on the supply pressure without using the input information in the second process. Specifically, in the case where a criterion is included in the attachment information in the attachment list L1 stored in the storing device 22, the controller 21 refers to the attachment list L1 in the storing device 22, and selects a candidate attachment ID with information-for-determination satisfying the criterion. In so doing, the controller 21 causes the user interface 25 to display a confirmation screen for confirmation of whether to select the candidate attachment ID, and, if the confirmation is inputted by the driver or the like via the confirmation screen, the controller 21 selects the attachment ID. In such a case, the input of confirmation by the driver or the like on the confirmation screen may be skipped.

Furthermore, although the above description of example embodiments discusses example cases in which the second process includes selecting the candidate attachment ID that was provisionally selected in the first process, the controller 21 may, if no input information has been received or the input information does not satisfy the selection conditions and the controller 21 fails to provisionally select any candidate attachment ID in the first process, select the attachment ID of the attachment 30 attached to the quick hitch 16 based on the supply pressure in the second process. Even in this case, the controller 21 causes the user interface 25 to display a confirmation screen for confirmation of whether to select the candidate attachment ID, and, if the confirmation is inputted by the user via the confirmation screen, the controller 21 selects the attachment ID. However, also in such a case, the input of confirmation by the driver or the like on the confirmation screen may be skipped.

An example of the predetermined process is a process in which the controller 21 causes the user interface 25 to output (display) information indicating that the attachment 30 corresponding to the selected attachment ID is attached to the quick hitch 16 (working vehicle 1). Another example of the predetermined process is a process in which the controller 21 controls output of hydraulic fluid (power) to the attachment 30 attached to the quick hitch 16 (controls start and stop of the supply of hydraulic fluid to the attachment 30) according to the selected attachment ID. It is noted here that the controller 21 may also control at least one of the introduction of hydraulic fluid from the attachment 30, the amount of hydraulic fluid supplied to the attachment 30, or the pressure of hydraulic fluid supplied to the attachment 30.

Display data and control data are pre-set for each of the attachment IDs of attachments 30 attachable to the quick hitch 16, i.e., attachments 30 which can be used with the working vehicle 1.

FIG. 7 is a table showing an example of the relationship between the attachment IDs of the attachments 30 attachable to the quick hitch 16 and pieces of display data corresponding to the attachments 30. A piece of display data is data based on which the user interface 25 displays information about a corresponding attachment 30. The display data includes, for example, an icon, name, and specifications of the corresponding attachment 30. Such an attachment ID and display data of the attachment 30 are stored in a predetermined storage area of the storing device 22 such that the attachment ID and the display data of the attachment 30 are associated with each other. Note that display data other than that described above may be stored in the storing device 22 such that the display data is associated with the attachment ID.

FIG. 8 is a table showing an example of the relationship between the attachment IDs of the attachments 30 attachable to the quick hitch 16 and pieces of control data corresponding to the attachments 30. A piece of control data indicates control performed by the working vehicle 1 according to what attachment 30 is used. The control data includes, for example, the level of the amount of hydraulic fluid supplied to the corresponding attachment 30. Such an attachment ID and control data of the attachment 30 are stored in a predetermined storage area of the storing device 22 such that the attachment ID and the control data of the attachment 30 are associated with each other. Note that other control data, such as the level of hydraulic pressure outputted to the attachment 30 and/or the output value of power other than hydraulic fluid, may be stored in the storing device 22 such that the control data is associated with the attachment ID.

Figure 9:
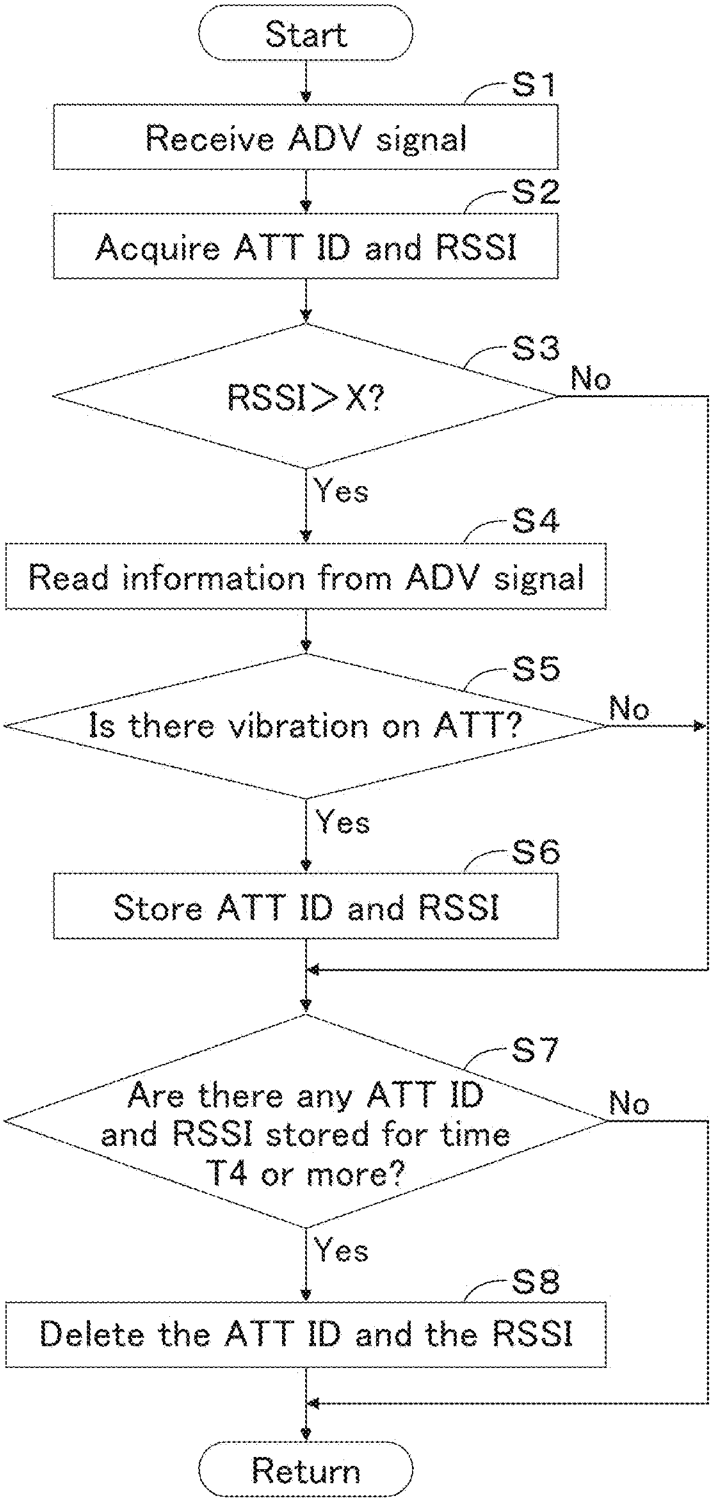
FIG. 9 is a flowchart showing an example of an attachment information collecting process.
Figure 10A:
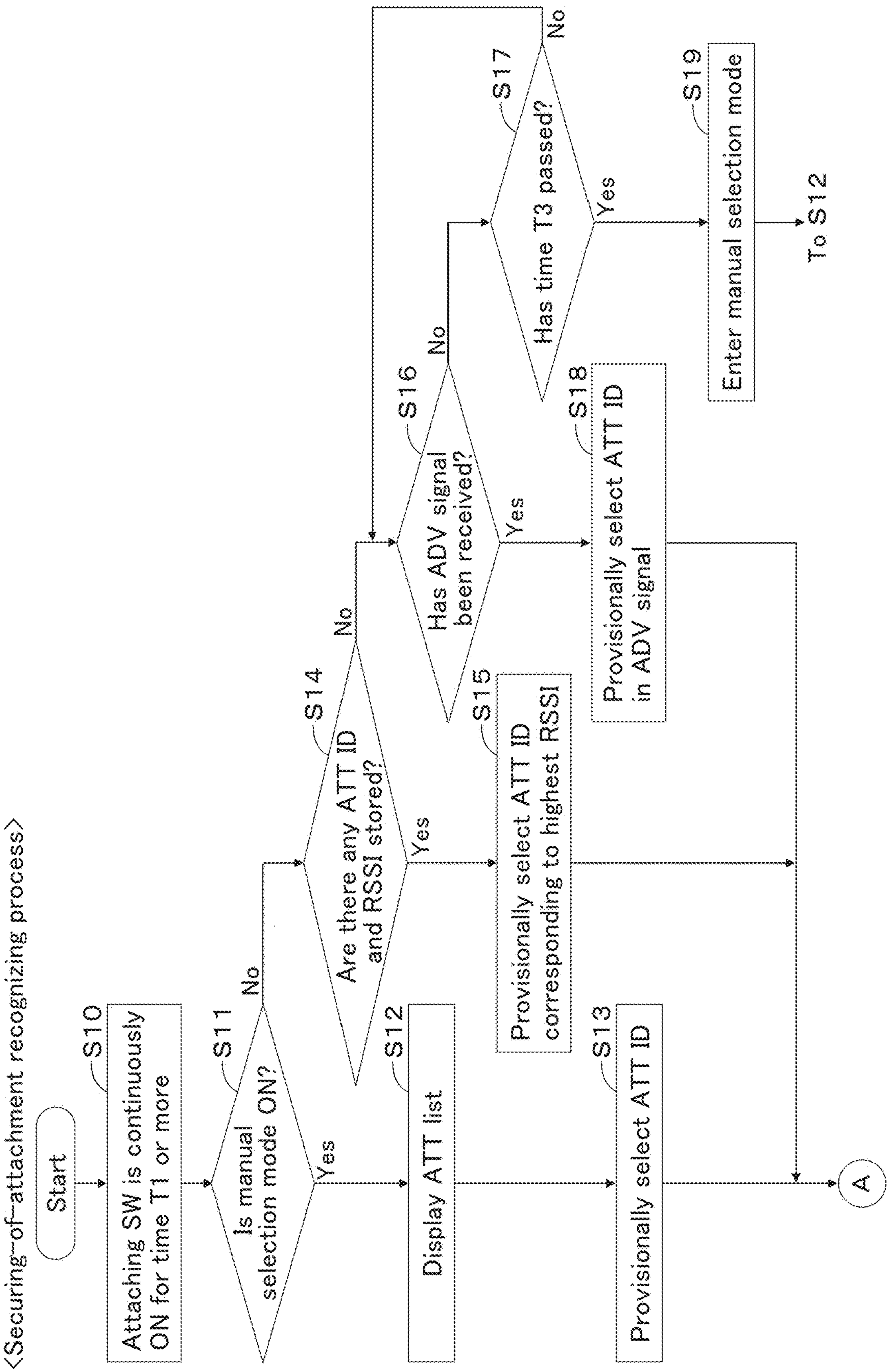
FIG. 10A is a flowchart showing an example of a securing-of-attachment recognizing process.
Figure 10B:
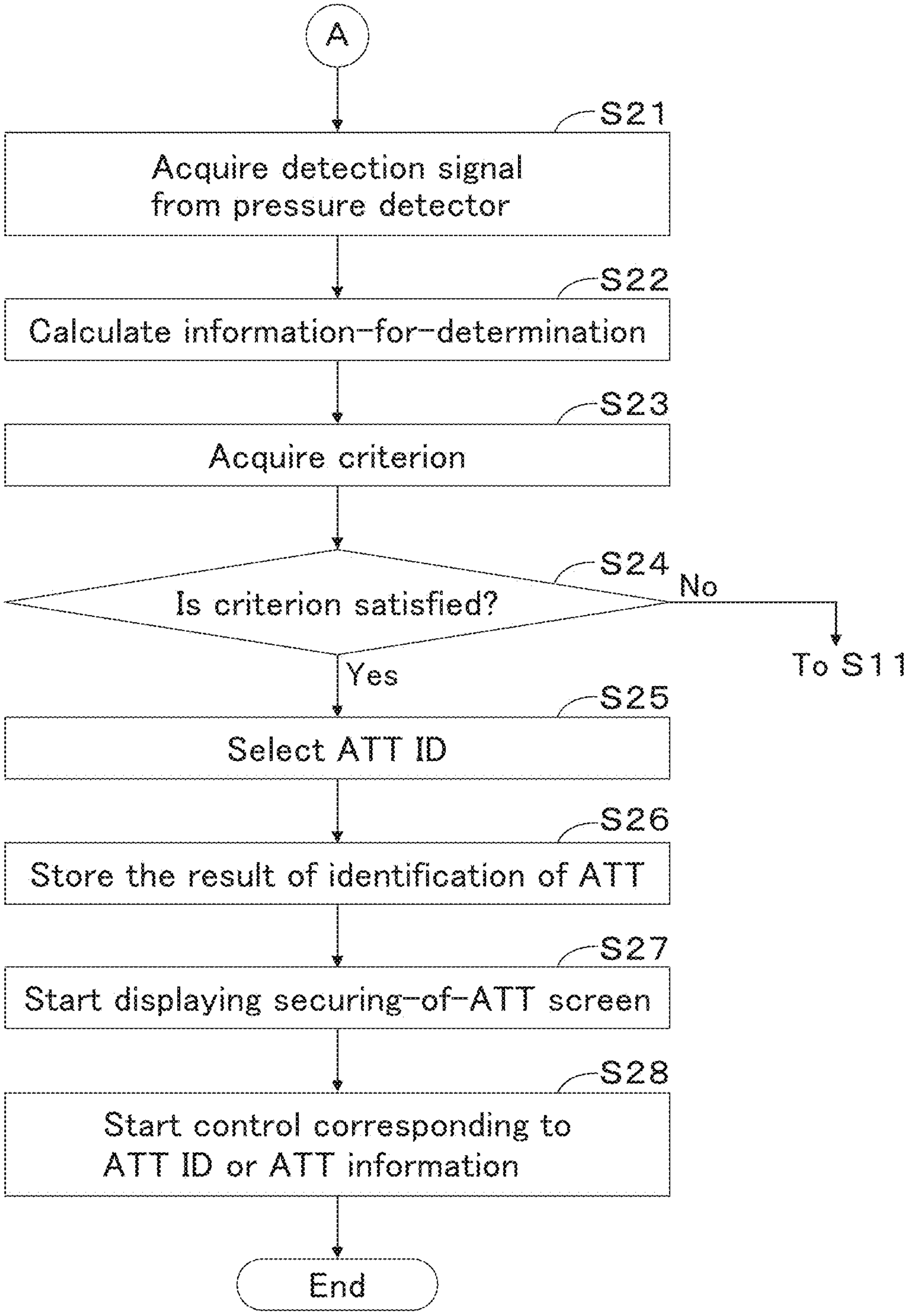
FIG. 10B is a flowchart showing an example of a securing-of-attachment recognizing process.

FIG. 9 is a flowchart showing an example of an attachment information collecting process. FIGS. 10A and 10B is a flowchart showing an example of a securing-of-attachment recognizing process. The attachment information collecting process and the securing-of-attachment recognizing process are performed by the controller 21 of the working vehicle 1 based on software program(s) stored in the internal memory 21*a* and/or the storing device 22. For convenience of description, the advertisement signal Q1 is referred to as "ADV signal", and the attachment 30 is referred to as "ATT", in FIG. 9. The same applies to FIGS. 13A, 13B, 14A, and 14B described later.

The following first discusses an example of an attachment information collecting process with reference to FIG. 9. Upon receipt of an advertisement signal Q1 from the beacon transmitter 33 by the beacon scanner 23 (S1), the controller 21 acquires the attachment ID in the advertisement signal Q1 and the RSSI of the advertisement signal Q1 from the beacon scanner 23 (S2).

Next, if the acquired RSSI is greater than a predetermined value (first predetermined value) X (YES in S3), the controller 21 reads information from the received advertisement signal Q1 (S4).

Next, if the information read from the advertisement signal Q1 includes vibration information indicating that the attachment 30 is vibrating, the controller 21 determines that there is vibration on the attachment 30 (YES in S4). Alternatively, if the information read from the advertisement signal Q1 includes a vibration indicator and the vibration indicator is greater than a predetermined value (second predetermined value) Y, the controller 21 determines that there is vibration on the attachment 30 (YES in S5).

Next, the controller 21 causes the internal memory 21*a* to store the attachment ID included in the received advertisement signal Q1 and the RSSI of the advertisement signal Q1 such that the attachment ID and the RSSI are associated with each other (S6). It is noted here that the controller 21 causes the internal memory 21*a* to also store, for example, information relating to the time at which the attachment ID and the RSSI were stored (such as a timestamp) such that the information is associated with the attachment ID and the RSSI. The controller 21 may cause the internal memory 21*a* to also store, for example, a beacon ID and/or other information included in the received advertisement signal Q1 such that the beacon ID and/or the other information are associated with the attachment ID and the RSSI.

In contrast, if the RSSI of the received advertisement signal Q1 is equal to or less than the predetermined value X (NO in S3), the controller 21 does not cause the internal memory 21*a* to store the attachment ID included in the received advertisement signal Q1 or the RSSI of the advertisement signal Q1. Also if the received advertisement signal Q1 does not include vibration information indicating that the attachment 30 is vibrating (or the vibration indicator greater than the predetermined value Y) and it is determined that there is no vibration on the attachment 30 (NO in S5), the controller 21 does not cause the internal memory 21*a* to store the attachment ID included in the received advertisement signal Q1 or the RSSI of the advertisement signal Q1.

If any of the attachment ID(s) or RSSI(s) in the internal memory 21*a* has been stored for the period of time T4 or more (YES in S7), the controller 21 deletes that attachment ID(s) and RSSI(s) from the internal memory 21*a* (S8). It is noted here that the controller 21 also deletes, from the internal memory 21*a*, other information (such as time information) corresponding to the attachment ID(s) having been stored for the period of time T4 or more. The period of time T4 is, for example, about 30 seconds which corresponds to at least one of the time for an attachment 30 to be attached to the working vehicle 1 or the time for the attachment 30 to be replaced with another one. After step S8, the controller 21 repeats step S1 and subsequent steps.

Figure 11:
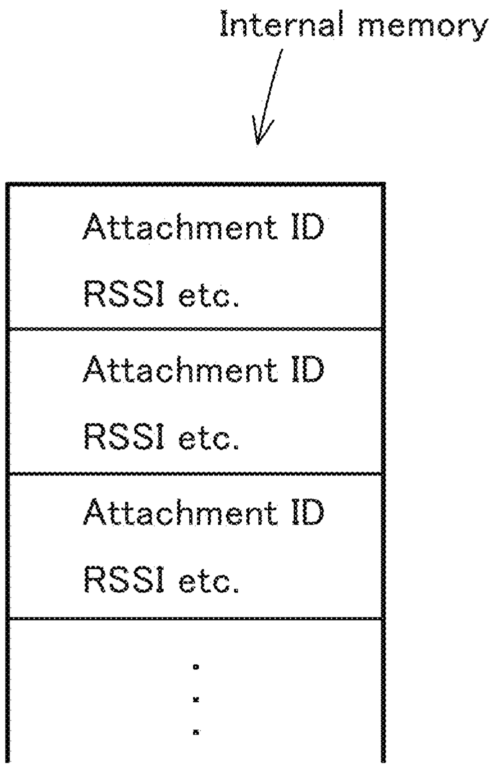
FIG. 11 is a diagram showing an example of information stored in an internal memory of a controller.

FIG. 11 shows information stored in the internal memory 21*a* of the controller 21. The controller 21 repeats the attachment information collecting process shown in FIG. 9, so that attachment IDs and their corresponding RSSIs are collected in the internal memory 21*a* as shown in FIG. 11.

Specifically, the controller 21 selects one of the advertisement signal(s) Q1 that is received by the beacon scanner 23 from the beacon transmitter 33 on the attachment 30 which is located close to the quick hitch 16 (working vehicle 1) to some extent and which has vibrated when attached to the quick hitch 16. The attachment ID included in the selected advertisement signal Q1 and the RSSI of that advertisement signal Q1 are stored (collected) in the internal memory 21*a* of the controller 21 for the period of time T4. For another example, the controller 21 may cause the storing device 22 to store the attachment ID and the RSSI of the advertisement signal Q1 for the period of time T4.

During the steps of attaching the attachment 30 described above, the attachment 30 vibrates, for example, when the front plates 50*f* of the brackets 50 are brought into engagement with the base plate 71 of the attachment 30, when the attachment 30 is raised by the working device 4, and/or when the attachment 30 is latched by the latching mechanisms 51. The advertisement signal Q1 transmitted by the beacon transmitter 33 includes vibration information relating to the vibration state of the attachment 30 that has been detected by the vibration sensor 34 at any of the above-listed points in time.

The following discusses an example of the securing-of-attachment recognizing process with reference to FIGS. 10A and 10B. When the attaching switch 26 is operated (turned ON) continuously for a first predetermined period of time T1 or more (S10 in FIG. 10A), the controller 21 determines that the quick hitch 16 has switched from the first mode to the second mode and that the attachment 30 is attached (secured) to the quick hitch 16. Next, in the case where the controller 21 is in the manual selection mode (YES at S11), the controller 21 allows the driver or the like to select, via the user interface 25, the attachment information indicating the attachment 30 attached to the quick hitch 16 from the attachment list L1 (S12). Next, the controller 21 provisionally selects a candidate for the attachment 30 attached to the quick hitch 16 based on the selected attachment information (S13).

In the case where the automatic selection mode is selected (NO in S11), the controller 21 determines whether or not any attachment IDs are stored in the internal memory 21*a* (S14).

If the internal memory 21*a* stores one or more attachment IDs and corresponding one or more RSSIs therein (YES in S14), the controller 21 reads the one or more RSSIs and the one or more attachment IDs stored in the internal memory 21*a*, and provisionally selects a candidate which is one of the one or more attachment IDs that corresponds to the highest one of the RSSIs (S15).

On the contrary, if the internal memory 21*a* stores no attachment IDs or RSSIs (NO in S14), the controller 21 determines whether or not the beacon scanner 23 has received any advertisement signals Q1 from beacon transmitter(s) 33. For example, assume that the beacon scanner 23 receives an advertisement signal Q1 within a third predetermined period of time T3 (NO in S17) from when the attaching switch 26 has been operated continuously for the first predetermined period of time T1 or more (S10) (YES in S16). In such a case, the controller 21 provisionally selects a candidate for the attachment ID that is included in this advertisement signal Q1 (S18).

For another example, in the case where the beacon scanner 23 receives a plurality of advertisement signals Q1 within the third predetermined period of time T3 (YES in S16), if any of the advertisement signals Q1 satisfies selection condition(s), the controller 21 may provisionally select a candidate for the attachment 30 attached to the quick hitch 16 based on the attachment ID included in this advertisement signal Q1 (S18).

If the beacon scanner 23 does not receive any advertisement signals Q1 within the third predetermined period of time T3, the controller 21 may enter the manual selection mode (S19) and proceed to S12. Note that the third predetermined period of time T3 is, for example, about 10 seconds.

If a candidate attachment ID is provisionally selected in the first process (S13, S15, S18), the controller 21 acquires a detection signal from the pressure detector(s) 62 when the attaching switch 26 has been operated (turned ON) continuously for a first predetermined period of time T1 or more (S21). Upon acquisition of the detection signal (S21), the controller 21 calculates information-for-determination based on the detection signal (S22). The controller 21 acquires a criterion corresponding to the provisionally selected candidate attachment ID from the storing device 22 (S23), and determines whether the value of the information-for-determination satisfies the criterion (S24).

If the controller 21 determines that the value of the information-for-determination satisfies the criterion (YES at S24), the controller 21 selects the attachment ID that was provisionally selected in the first process and that satisfies the criterion (S25). Then, the controller 21 stores the result of identification of the attachment 30 in the storing device 22 (S26). In so doing, the controller 21 causes the storing device 22 to store information indicating that the identified attachment 30 is attached to the quick hitch 16, i.e., information indicating that the attachment 30 is attached to the working vehicle 1, and the attachment ID of the attached attachment 30. The controller 21 starts a display process (predetermined process) to cause the user interface 25 to display (output) the "attachment is attached" screen G1 which indicates that the attachment 30 corresponding to the selected attachment ID is attached and the attachment information of the attached attachment (S27).

On the other hand, if the controller 21 determines that the value of the information-for-determination does not satisfy the criterion (NO at S24), the controller 21 does not select the candidate attachment ID provisionally selected in the first process, returns to S11, and again performs a provisionally selection of another candidate attachment ID. In so doing, the controller 21 may enter the manual selection mode.

Figure 12:
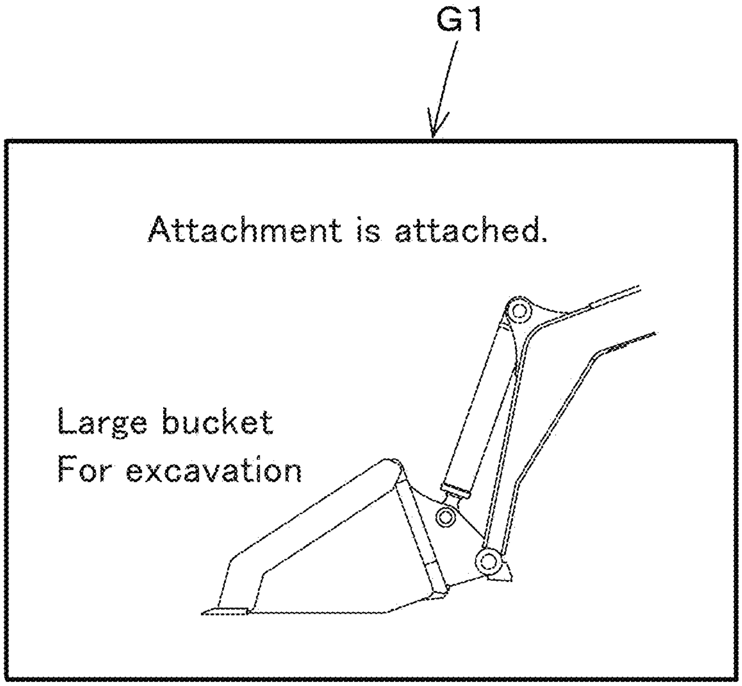
FIG. 12 illustrates an example of an "attachment is attached" screen (securing-of-attachment screen).

FIG. 12 illustrates an example of the "attachment is attached" screen G1 (securing-of-attachment screen). The "attachment is attached" screen G1 displays a message indicating that the attachment 30 is attached, the attachment information relating to the attached attachment 30, and an icon of the attachment 30. In the example in FIG. 12, the attachment information "Large bucket" "for excavation" is displayed. Additionally or alternatively, other attachment information such as the attachment ID, size, and/or manufacturer of the attachment 30 may be displayed. The display data for the "attachment is attached" screen G1 and the attachment information are prestored in the storing device 22.

For another example, the controller 21 may cause the communicator 24 (FIG. 4) to transmit, to the portable device 70, the display data for the "attachment is attached" screen G1 and the attachment information of the attachment 30 which has been determined as being attached so that the "attachment is attached" screen G1 is displayed on a display of the portable device 70.

The controller 21 starts predetermined control (predetermined process) according to the attachment ID selected in step S25 (S28). In so doing, the controller 21 reads control data corresponding to the selected attachment ID form the storing device 22 and starts control corresponding to the attachment 30 attached to the quick hitch 16 based on the control data.

Specifically, in the case where the attachment 30 attached to the quick hitch 16 is an attachment 30*b* including a hydraulic actuator 36 such as a skid cutter, the controller 21 starts causing the control valve 40*d* to control the output of hydraulic fluid from the hydraulic fluid outlet port 18*a* to the attachment 30*b*, based on the control data read from the storing device 22. With this, draining of return fluid to be introduced from the attachment 30*b* into the hydraulic fluid inlet port 18*b* is also started. The controller 21 may, for example, cause the "attachment is attached" screen G1 to display a message indicating that the control of the output of hydraulic fluid to the attachment 30*b* has been started.

Note that, in the case where the attachment 30 attached to the quick hitch 16 is an attachment 30 including no hydraulic actuators such as a bucket 30*a*, the controller 21 does not cause the control valve 40*d* to output hydraulic fluid from the hydraulic fluid outlet port 18*a* to the attachment 30 based on the control data read from the nonvolatile memory 22. The controller 21 may start control such as adjusting and/or limiting the travel speed and/or speed stage of the working vehicle 1 and/or the height of the raised/lowered arms 11 according to the selected attachment ID in step S28.

Note that the above description of the example embodiments discusses example cases in which the controller 21 performs a first process to provisionally select a candidate attachment ID based on the input information and a second process to select the attachment ID based on the supply pressure. However, the controller 21 may be configured or programmed to select an attachment ID based on the input information and, if the information-for-determination does not satisfy the criterion corresponding to the selected attachment ID, issue a warning. For example, the user interface 25, etc., issues a warning using a message on the "attachment is attached" screen G1 to indicate that the selected attachment ID may be incorrect. In so doing, the attachment ID with information-for-determination satisfying the criterion and/or the attachment 30 corresponding to the attachment ID may be displayed on the "attachment is attached" screen G1. In such a case, the controller 21 may be configured or programmed to, in addition to or instead of issuing a warning via the user interface 25 or the like, enter the manual selection mode and perform a selection of an attachment ID again.

Figure 13A:
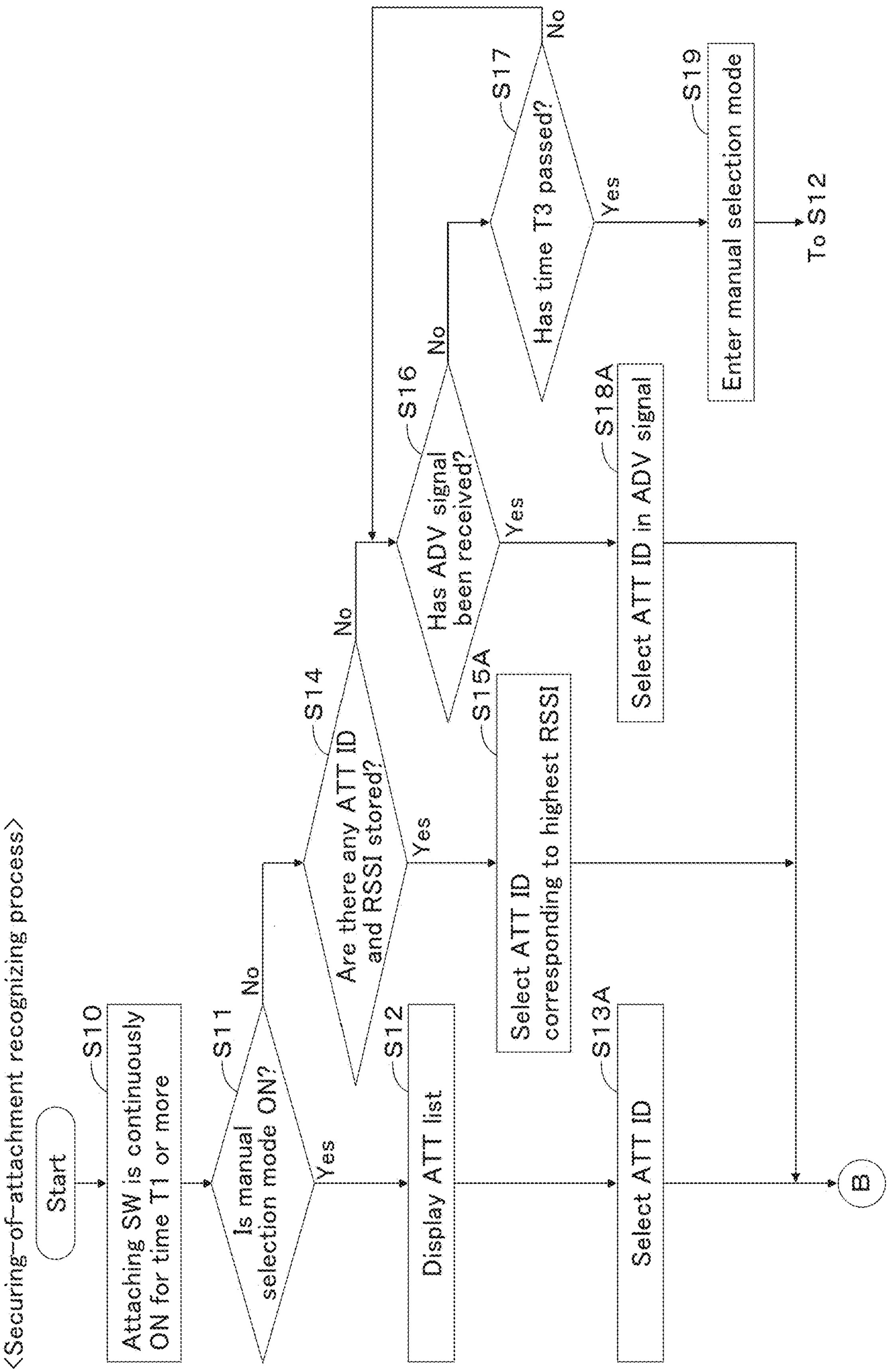
FIG. 13A is a flowchart showing another example of a securing-of-attachment recognizing process.
Figure 13B:
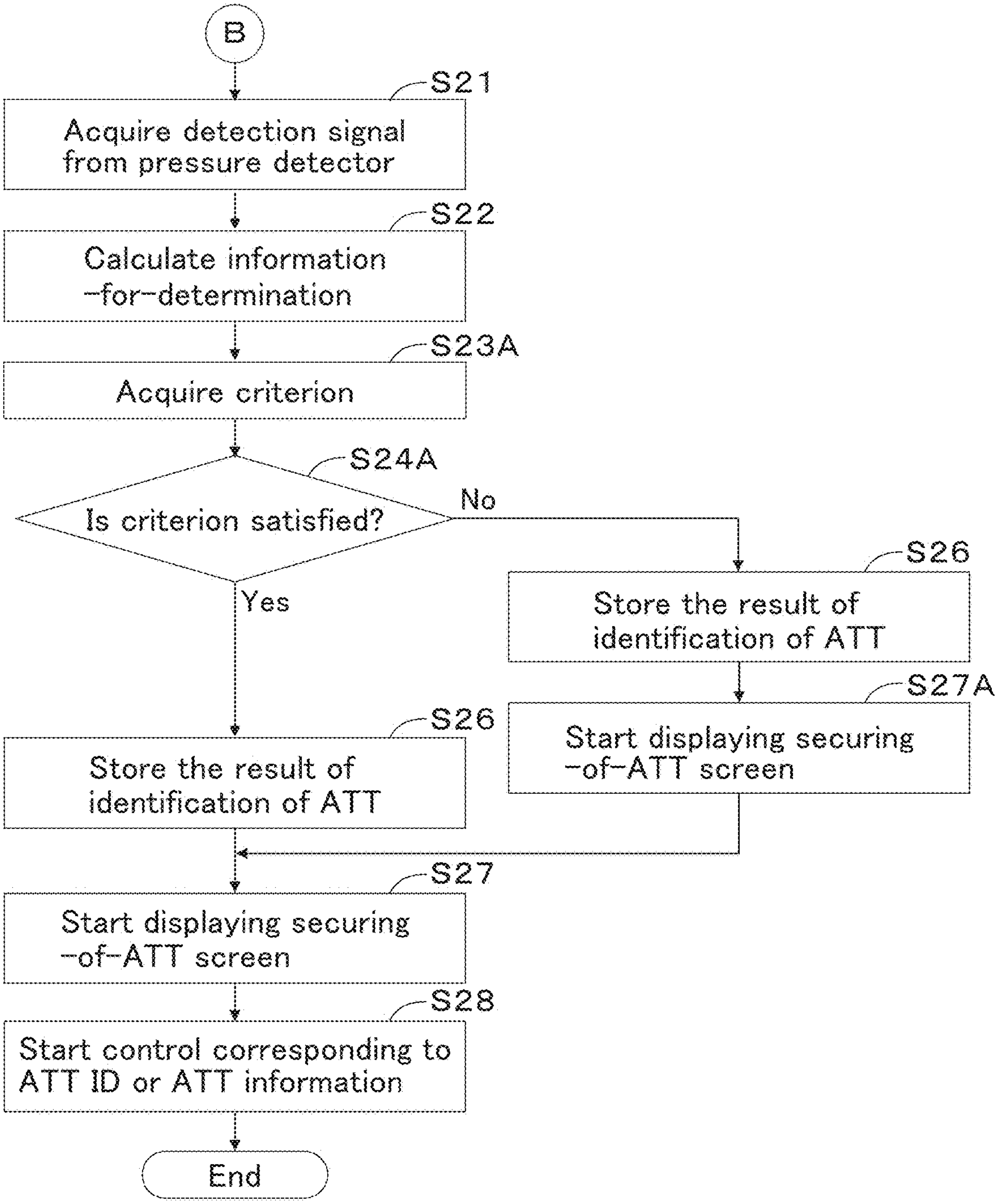
FIG. 13B is a flowchart showing another example of a securing-of-attachment recognizing process.

The following discusses an example of a securing-of-attachment recognizing process according to such a variation with reference to FIGS. 13A and 13B. The description for the steps which are the same as those of the securing-of-attachment recognizing process discussed using FIGS. 10A and 10B may be omitted here. When the attaching switch 26 is operated (turned ON) continuously for a first predetermined period of time T1 or more (S10 in FIG. 13A), in the case where the controller 21 is in the manual selection mode (YES at S11), the controller 21, after S12, selects the attachment 30 attached to the quick hitch 16 based on the selected attachment information (S13A).

In the case where the controller 21 is in the automatic selection mode (NO at S11), if at least one attachment ID and at least one RSSI corresponding to the attachment ID are stored in the internal memory 21*a* (YES at S14), the controller 21 reads the RSSI(s) and the attachment ID(s) stored in the internal memory 21*a*, and selects one of the attachment ID(s) that corresponds to the highest RSSI (S15A).

On the other hand, if no attachment IDs or RSSIs are stored in the internal memory 21*a* (NO at S14), an advertisement signal Q1 is received by the beacon scanner 23 (YES at S16) during a third predetermined period of time T3 (NO at S17) after the attaching switch 26 has been operated for a first predetermined period of time T1 or more (S10). In this case, the controller 21 selects the attachment ID included in the advertisement signal Q1 (S18A).

When the attachment ID is selected at S13A, S15A or S18A, after the controller 21 performs S21 and S22, the controller 21 acquires a criterion corresponding to the selected attachment ID from the storing device 22 (S23A), and determines whether the value of the information-for-determination satisfies the criterion (S24A).

If the controller 21 determines that the value of the information-for-determination satisfies the criterion (YES at S24A), the controller 21 proceeds to S26 in order to cause the storing device 22 to store the result of identification of the attachment 30.

On the other hand, if the controller 21 determines that the value of the information-for-determination does not satisfy the criterion (NO at S24A), after proceeding to S26, the controller 21 issues a warning, in the message on the "attachment is attached" screen G1, to indicate that the selected attachment ID may be incorrect (S27A). Alternatively, the controller 21 may return to S11 and again perform a provisional selection of another candidate attachment ID.

The description of the example embodiments discusses example cases in which the controller 21 performs a first process to provisionally select a candidate attachment ID based on the input information, and a second process to select the attachment ID based on the supply pressure. However, the controller 21 may be configured or programmed to perform a first process to provisionally select a candidate attachment ID based on the supply pressure, and a second process to determine whether the attachment 30 corresponding to the candidate attachment ID provisionally selected in the first process is the attachment 30 attached to the quick hitch 16 based on the input information.

Specifically, in the present variation, in the case where the input 80 includes the user interface 25 and the controller 21 is in the manual selection mode, the controller 21, in the first process, provisionally selects candidate attachment ID(s) for which the information-for-determination based on the supply pressure satisfies the criterion, and, in the second process, displays such candidate attachment(s) 30 in the attachment list L1 to allow manual selection of an attachment ID. That is, the user interface 25 displays the attachment list L1 which does not include the attachments 30 not provisionally selected in the first process.

In the present variation, in the case where the input 80 includes the beacon scanner 23 and the controller 21 is in the automatic selection mode, the controller 21, in the first process, provisionally selects candidate attachment ID(s) for which the information-for-determination based on the supply pressure satisfies the criterion, and, in the second process, the controller 21 automatically selects the attachment ID corresponding to the highest RSSI from the candidate attachment ID(s) provisionally selected in the first process, among the attachment ID(s) stored in the internal memory 21*a*.

Figure 14A:
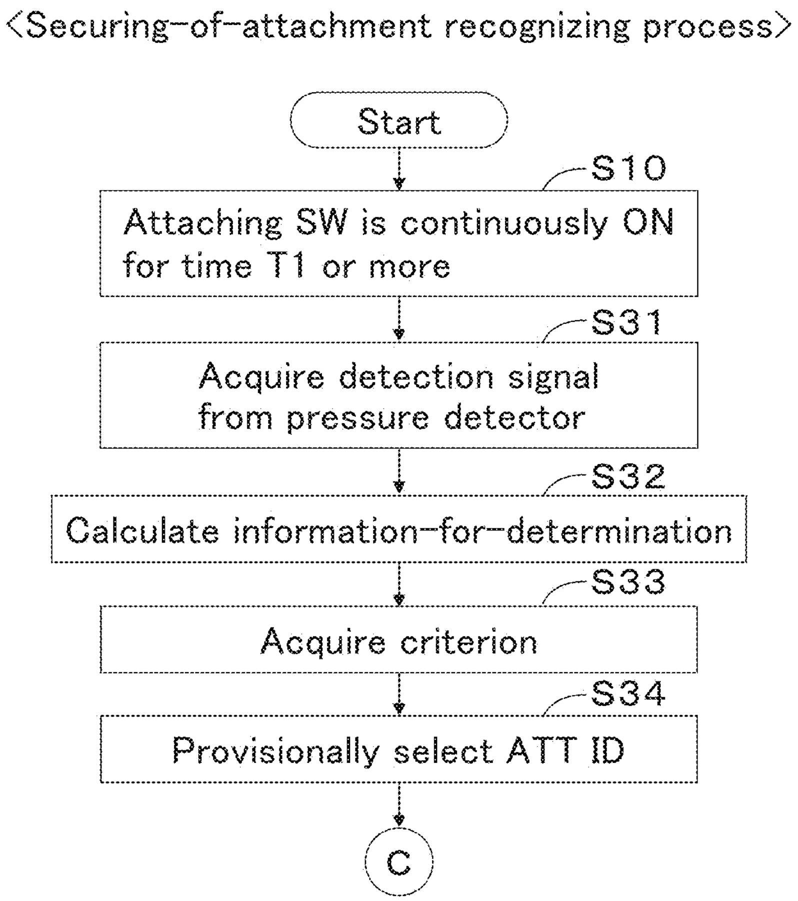
FIG. 14A is a flowchart showing another example of a securing-of-attachment recognizing process.
Figure 14B:
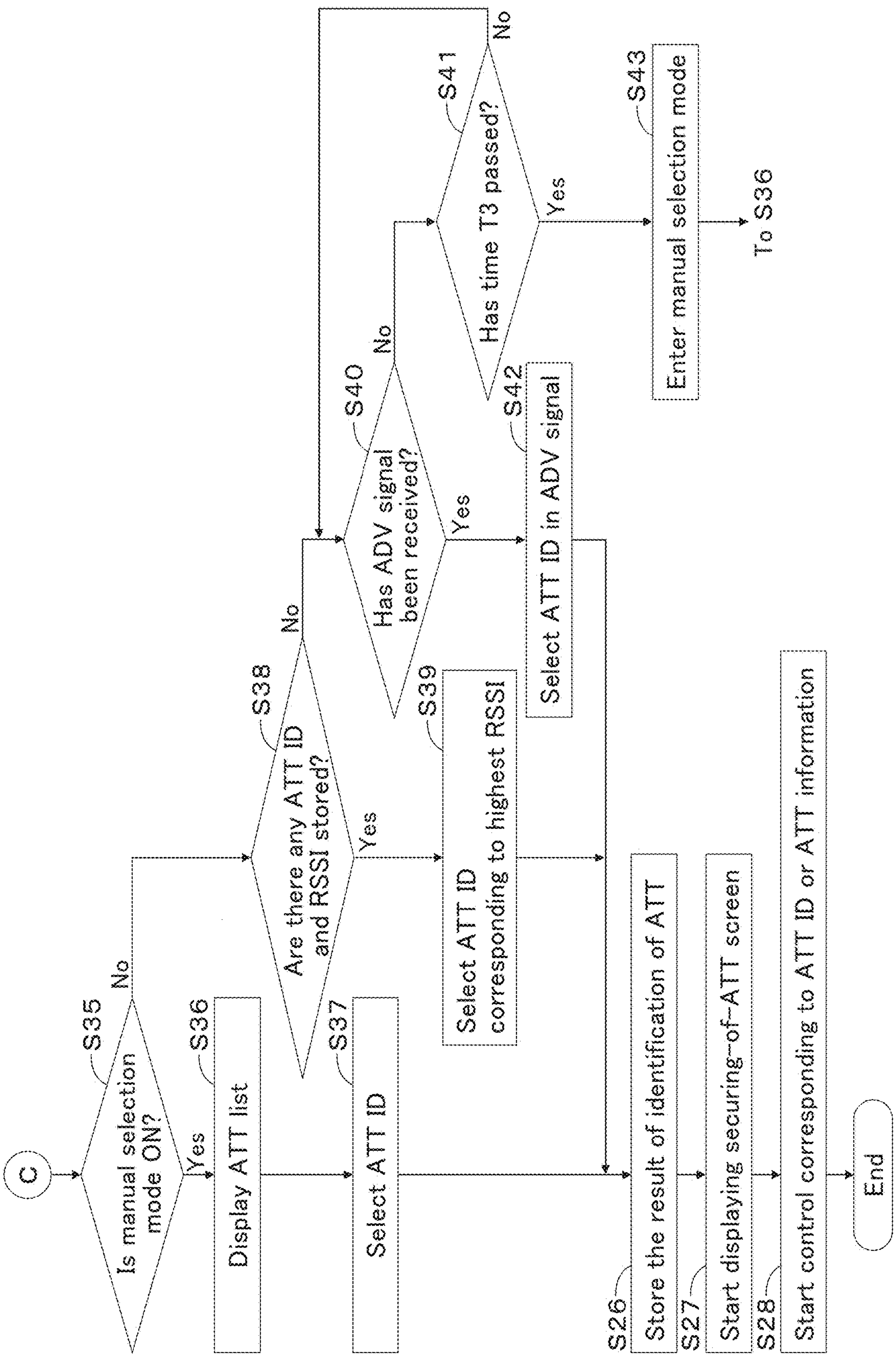
FIG. 14B is a flowchart showing another example of a securing-of-attachment recognizing process.

The following discusses an example of a securing-of-attachment recognizing process according to such a variation with reference to FIGS. 14A and 14B. The description for the steps which are the same as those of the securing-of-attachment recognizing process discussed using FIGS. 10A and 10B may be omitted here. When the attaching switch 26 is operated (turned ON) continuously for a first predetermined period of time T1 or more (S10 in FIG. 14A), the controller 21 acquires a detection signal from the pressure detector(s) 62 at that time (that is, acquires a detection signal when the attaching switch 26 has been operated (turned ON) continuously for a first predetermined period of time T1 or more) (S31). Upon acquisition of the detection signal (S31), the controller 21 calculates information-for-determination based on the detection signal (S32). The controller 21 acquires a criterion corresponding to each candidate attachment ID from the storing device 22 (S33), and provisionally selects the attachment ID(s) corresponding to the information-for-determination satisfying the criterion (first process) (S34).

When candidate attachment ID(s) is/are provisionally selected in the first process (S34), in the case where the controller 21 is in the manual selection mode (YES at S35), the controller 21 causes the user interface 25 to display the candidate attachment ID(s) provisionally selected in the first process, and the driver or the like selects the attachment information indicating the attachment 30 attached to the quick hitch 16 from the attachment list L1 via the user interface 25 (S36). Then, the controller 21 selects the attachment 30 attached to the quick hitch 16 based on the selected attachment information (S37).

In the case where the automatic selection mode is selected (NO in S35), the controller 21 determines whether or not any attachment IDs are stored in the internal memory 21*a* (S38).

If the internal memory 21*a* stores one or more provisionally selected candidate attachment IDs and corresponding one or more RSSIs therein (YES in S38), the controller 21 reads the one or more RSSIs and the one or more attachment IDs stored in the internal memory 21*a*, and selects one of the one or more attachment IDs that corresponds to the highest one of the RSSIs (S39).

On the contrary, if the internal memory 21*a* stores no provisionally selected candidate attachment IDs or RSSIs (NO in S38), the controller 21 determines whether or not the beacon scanner 23 has received any advertisement signals Q1 from beacon transmitter(s) 33. For example, assume that the beacon scanner 23 receives an advertisement signal Q1 within a third predetermined period of time T3 (NO in S41) from when the attaching switch 26 has been operated continuously for the first predetermined period of time T1 or more (S10) (YES in S40). In such a case, the controller 21 selects the attachment 30 attached to the quick hitch 16 based on the attachment ID included in this advertisement signal Q1 (S42).

For another example, in the case where the beacon scanner 23 receives a plurality of advertisement signals Q1 within the third predetermined period of time T3 (YES in S40), the controller 21 may, if any of the advertisement signals Q1 satisfies selection condition(s), select the attachment 30 attached to the quick hitch 16 based on the attachment ID included in this advertisement signal Q1 (S42).

If the beacon scanner 23 does not receive any advertisement signals Q1 within the third predetermined period of time T3, the controller 21 may enter the manual selection mode (S43) and proceed to S36.

Then, upon selecting the attachment ID, the controller 21 proceeds to S26 in order to cause the storing device 22 to store the result of identification of the attachment 30.

Although the above description of the example embodiments discusses example cases in which the controller 21 selects the attachment ID of the attachment 30 attached to the quick hitch 16 based on the input information and the supply pressure, the controller 21 may select the attachment ID based only on the supply pressure without relying on the input information.

The determination regarding the first to third acquisition conditions by the controller 21 as described above are merely examples, and this does not imply any limitation. The controller 21 need only acquire the supply pressure obtained when the first to third acquisition conditions are at least satisfied, and the supply pressure acquired by the controller 21 is not limited to the pressure obtained when the attachment 30 is attached to the quick hitch 16. Specifically, the controller 21 may select an attachment ID based on the supply pressure obtained when, upon operation of the attaching switch 26 (first acquisition condition), the attachment 30 is attached to the quick hitch 16 and then the attachment 30 attached to the quick hitch 16 is caused to be out of contact with the contact surface by the lifter C (second and third acquisition conditions). Accordingly, the controller 21 may perform a securing-of-attachment recognizing process at any time, in addition to or instead of when the attachment 30 is attached to the quick hitch 16.

In the case where the controller 21 can calculate weight information, the controller 21 may perform an assist process based on the weight information in order to assist the driver. Specifically, the controller 21 can determine whether an attachment 30 is attached to the quick hitch 16 based on the weight information. In the case where the weight information indicates that an attachment 30 is attached to the quick hitch 16, the controller 21 allows supply of hydraulic fluid to the attachment 30 attached to the quick hitch 16. On the other hand, in the case where the weight information indicates that no attachments 30 are attached to the quick hitch 16, the controller 21 does not allow the supply of the hydraulic fluid.

Specifically, for example, in the case where the weight information indicates that an attachment 30 is attached to the quick hitch 16, the controller 21 allows the auxiliary mode to be activated using the auxiliary mode switch 28, and in the case where the weight information indicates that no attachments 30 are attached to the quick hitch 16, the controller 21 does not allow the auxiliary mode to be activated using the auxiliary mode switch 28. That is, in the case where the weight information indicates that no attachments 30 are attached to the quick hitch 16, the controller 21 does not activate the auxiliary mode.

More specifically, in the case where the weight information indicates that an attachment 30 is attached to the quick hitch 16, when the auxiliary mode switch 28 is operated, the controller 21 activates the auxiliary mode, and switches the position of the control valve 40*d* in response to the operation of the auxiliary output switch 29. On the other hand, in the case where the weight information indicates that no attachments 30 are attached to the quick hitch 16, even if the auxiliary switch 58 is operated, the controller 21 does not activate the auxiliary mode. In such a case, even if the auxiliary output switch 29 is operated, the controller 21 does not change the position of the control valve 40*d* from the neutral position.

Figure 15:
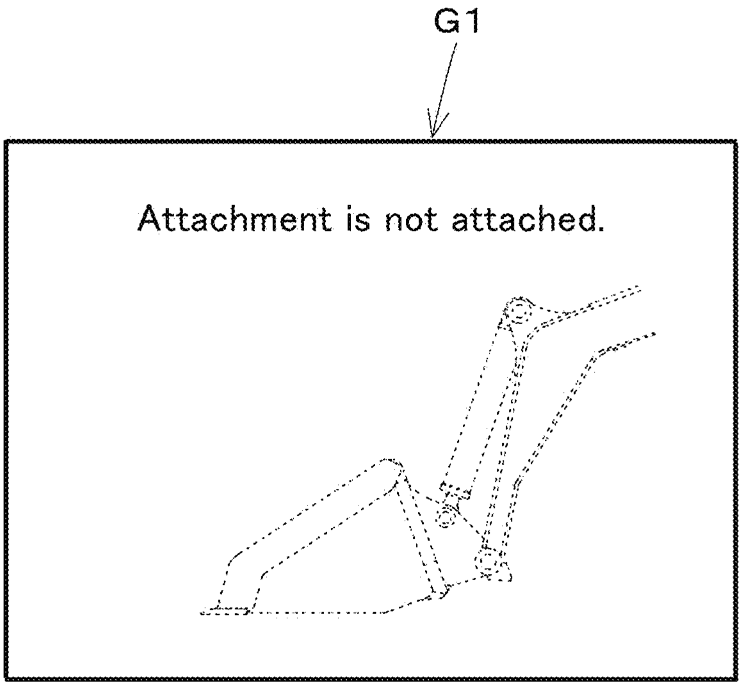
FIG. 15 illustrates another example of a securing-of-attachment screen.

In the case where the controller 21 can calculate weight information, in addition to or instead of allowing/disallowing the supply of hydraulic fluid based on the weight information, the user interface 25 may output information relating to the mounting of the attachment 30 based on the weight information. Specifically, in the case where the weight information indicates that no attachments 30 are attached to the quick hitch 16, the user interface 25 outputs information indicating that the attachment 30 corresponding to the attachment ID selected by the controller 21 is not attached. FIG. 15 illustrates another example of a securing-of-attachment screen G1. On the securing-of-attachment screen G1, a message indicating that no attachments 30 are attached and an icon indicating the attachment 30 are displayed. In the case where no attachments 30 are attached to the quick hitch 16, the icon is grayed out or is hidden. Note that, in the example shown in FIG. 15, the icon on the securing-of-attachment screen G1 is hidden (in FIG. 15, dashed lines indicate that the icon is hidden).

The above description of example embodiments discusses cases in which a beacon transmitter 33 to transmit a wireless signal (advertisement signal) Q1 compliant with Bluetooth (registered trademark) Low Energy is provided in or on an attachment 30, and a beacon scanner 23 to receive the advertisement signal Q1 is provided in or on the working vehicle 1. However, additionally or alternatively, for example, a beacon transmitter 33 such as a radio frequency identification (RFID) tag or the like may be provided in or on the attachment 30, and a beacon scanner 23 to receive the advertisement signal Q1 transmitted from the RFID may be provided in or on the working vehicle 1. A beacon transmitter 33 to transmit radio waves for some other near field communication may be provided in or on the attachment 30, and a beacon scanner 23 to receive the radio waves may be provided in or on the working vehicle 1.

The above description of example embodiments discusses examples in which the quick hitch 16 is included in the working vehicle 1. However, alternatively, the working vehicle 1 may include a quick hitch 16 with a structure different from the above quick hitch 16, a quick hitch 16 that can attach and detach an attachment 30 thereto and therefrom both manually and automatically, or a quick hitch 16 that can attach or detach an attachment 30 thereto and therefrom only manually. In the case where the worker manually attaches or detaches an attachment 30 to/from the quick hitch 16, information indicating that the attaching or detaching has been completed may be inputted via the user interface 25.

The above description of example embodiments discusses examples in which the driver inputs attachment information indicating the attachment 30 attached to the quick hitch 16 via the user interface 25 included in the working vehicle 1. However, for example, the driver or the like may input attachment information indicating the attachment 30 attached to the quick hitch 16 via the portable device 70. That is, the portable device 70 may be used as a user interface 25 instead of the above-described user interface 25.

In such a case, when the attachment information is inputted in the portable device 70, the portable device 70 transmits the attachment information to the communicator 24 of the working vehicle 1 via the Internet and/or the like. Then, when the controller 21 of the working vehicle 1 receives the attachment information via the communicator 24, the controller 21 recognizes the attachment 30 attached to the quick hitch 16 based on the attachment ID included in the attachment information.

The above description of example embodiments discusses examples in which hydraulic actuators (arm cylinders 14, front cylinders 15, a latch cylinder 52, etc.) are provided in or on a working device 4, a quick hitch 16 and a specific attachment 30*b*. However, additionally or alternatively, electric actuators may be provided in or on the working device 4, the quick hitch 16 and the predetermined attachment 30. In the case where an attachment 30 including an electric actuator is attached to the quick hitch 16, the controller 21 need only cause electricity (power) from the battery 20 (FIG. 1) to be outputted to the attachment 30 via an external electric wire as the power for the electric actuator based on the control data corresponding to the attachment 30.

An attachment 30 including working component(s) to be actuated by power from the prime mover 9 of the working vehicle 1 may be attached to the quick hitch 16. In the case where such an attachment 30 including working element(s) is attached to the quick hitch 16, the controller 21 need only cause the power from the prime mover 9 to be outputted to the attachment 30 via a power transmission mechanism including gear(s) and shaft(s) and the like based on the control data corresponding to the attachment 30.

Example embodiments of the present invention provide working vehicles 1 and attachment usage systems 100 described in the following items.

(Item 1) A working vehicle 1 including a machine body 2, a lifter C on the machine body 2, a linkage 16 to attach and detach an attachment 30 thereto and therefrom, the linkage 16 being supported by the lifter C such that the linkage 16 is raisable and lowerable by the lifter C, and a controller 21 configured or programmed to select identification information of the attachment 30 attached to the linkage 16 and start a predetermined process based on the selected identification information, wherein the lifter C is operable to be driven by at least one hydraulic actuator AC to raise or lower the linkage 16, and the controller 21 is configured or programmed to select the identification information of the attachment 30 attached to the linkage 16 based on a pressure of hydraulic fluid supplied to the at least one hydraulic actuator AC, the pressure being a pressure of hydraulic fluid supplied when the attachment 30 is caused to be out of contact with a contact surface by the lifter C.

With the working vehicle 1 according to item 1, it is possible to easily select the identification information of the attachment 30 attached to the linkage 19, i.e., easily select the attachment 30, using the pressure of hydraulic fluid supplied to hydraulic actuator(s) AC. The pressure of hydraulic fluid supplied to actuator(s) is the pressure obtained when the attachment 30 is actually supported, and therefore this makes it possible for the working vehicle 1 to easily improve the accuracy of identifying the attachment 30.

(Item 2) The working vehicle 1 according to item 1, further including an operation actuator 26 to be operated to attach the attachment 30 to the linkage 16, wherein the controller 21 is configured or programmed to select the identification information of the attachment 30 attached to the linkage 16 based on the pressure of the hydraulic fluid supplied when the attachment 30 attached to or to be attached to the linkage 16 is caused to be out of contact with the contact surface by the lifter C, and the operation actuator 26 is operated to attach the attachment 30 to the linkage 16.

With the working vehicle 1 according to item 2, the controller 21 is able to select the identification information of the attachment 30 attached to the linkage 16 based on the pressure of hydraulic fluid supplied when the operation actuator 26 is operated by the user (such as the driver or worker). Therefore, when the attachment 30 is attached to the linkage 16, the controller 21 is able to smoothly proceed to a process of selecting the identification information of the attachment 30 without requiring any operation other than the operation of the operation actuator 26 by the user. It is also possible to eliminate or reduce the likelihood that the user such as the driver will accidentally make unintended operation and the selection of the identification information of the attachment 30 will be performed again unintentionally.

(Item 3) The working vehicle 1 according to item 2, wherein the linkage 16 includes a hitch 16 selectively operable in a first mode in which the attachment 30 is allowed to be attached and detached or a second mode in which the attachment 30 is restricted from being attached and detached, and the controller 21 is configured or programmed to select the identification information of the attachment 30 attached to the linkage 16 based on the pressure of the hydraulic fluid supplied when the hitch 16 is switched from the first mode to the second mode to attach the attachment 30 thereto by operation of the operation actuator 26.

With the working vehicle 1 according to item 3, the controller 21 is able to detect that the linkage 16 has been switched from the first mode to the second mode and has entered the state in which the attachment 30 is attached, based on the operation of the operation actuator 26. Therefore, the controller 21 is able to recognize the mounting of an attachment 30 to the linkage 16 with high accuracy, and also able to smoothly select the identification information of the attachment 30 and to improve the accuracy of selecting the identification information. It is also possible to eliminate or reduce the likelihood that the user such as the driver will accidentally make unintended operation and the selection of the identification information of the attachment 30 will be performed again unintentionally.

(Item 4) The working vehicle 1 according to any one of items 1 to 3, further including an operation actuator 26 to be operated to attach the attachment 30 to the linkage 16, wherein the controller 21 is configured or programmed to select the identification information of the attachment 30 attached to the linkage 16 based on the pressure of the hydraulic fluid supplied when, upon operation of the operation actuator 26, the attachment 30 is attached to the linkage 16 and then the attachment 30 attached to the linkage 16 is caused to be out of contact with the contact surface by the lifter C.

With the working vehicle 1 according to item 4, since the attachment 30 attached to the linkage 16 is out of contact with the contact surface, the controller 21 is able to select the identification information of the attachment 30 based on the pressure of hydraulic fluid that is necessary to support the attachment 30 itself. This allows the controller 21 to select the identification information of the attachment 30 with high accuracy without any effect of disturbance that would result from the reaction force caused by the linkage 16 contacting the contact surface.

(Item 5) The working vehicle 1 according to any one of items 1 to 4, further including an input 80 to receive input of input information differing from the pressure of the hydraulic fluid, wherein the controller 21 is configured or programmed to select the identification information of the attachment 30 attached to the linkage 16 based on the pressure of the hydraulic fluid in addition to the input information.

With the working vehicle 1 according to item 5, the controller 21 is able to select the identification information of the attachment 30 based on the pressure of hydraulic fluid in addition to the input information input via the input 80. Thus, the controller 21 refers to more information, i.e., more selection conditions, in selecting the identification information attachment 30 than cases where the information referred to is only the input information, making it possible to improve the accuracy of selecting the identification information.

(Item 6) The working vehicle 1 according to item 5, wherein the input 80 includes a receiver 23 to receive a wireless signal Q1 which is periodically transmitted from a transmitter 33 in or on the attachment 30, which includes the identification information of the attachment 30, and which is compliant with a near field communication standard, the wireless signal Q1 being the input information received by the receiver 23, and the controller 21 is configured or programmed to select the identification information of the attachment 30 attached to the linkage 16 based on the wireless signal Q1 and the pressure of the hydraulic fluid from one or more pieces of identification information included in one or more of the wireless signals Q1 received by the receiver 23.

With the working vehicle 1 according to item 6, the controller 21 is able to select the identification information of the attachment 30 attached to the linkage 16 based on the pressure of hydraulic fluid, from piece(s) of identification information included in the wireless signal(s) Q1 transmitted from transmitter(s) 33 in or on attachment(s) 30. Thus, the controller 21 narrows down the pieces of identification information included in the wireless signals Q1 transmitted one-way from the transmitters 33 based on the pressure of hydraulic fluid, making it possible to improve the accuracy of selecting the identification information.

(Item 7) The working vehicle 1 according to item 6, wherein the controller 21 is configured or programmed to select the identification information of the attachment 30 attached to the linkage 16 based on a received signal strength of the wireless signal Q1 and the pressure of the hydraulic fluid.

With the working vehicle 1 according to item 7, the controller 21 is able to narrow down the pieces of identification information using the distance from the receiver 23 based on received signal strength, and to narrow down the pieces of identification information of attachments 30 using the pressure of hydraulic fluid which is other than the distance. Thus, the controller 21 improves the accuracy of selecting the identification information.

(Item 8) The working vehicle 1 according to item 5, wherein the input 80 includes a user interface 25 to allow a selection of information indicating an attachment from a plurality of the attachments attachable to the linkage, and receive input of the selected information as the input information, and the controller 21 is configured or programmed to select the identification information of the attachment 30 attached to the linkage 16 based on the information indicating the attachment 30 selected via the user interface 25 and based on the pressure of the hydraulic fluid.

With the working vehicle 1 according to item 8, it is possible to select the identification information of the attachment 30 not only by allowing the user (such as the driver or the worker) to manually select the information indicating the attachment 30 attached to the linkage 16 but also based on the pressure of hydraulic fluid. Thus, the controller 21 selects the identification information not only by relying on the manual selection by the user but also by referring to the pressure of hydraulic fluid, making it possible to improve the accuracy of the selection and convenience.

(Item 9) The working vehicle 1 according to any one of items 5 to 8, wherein the controller 21 is configured or programmed to perform a first process in which the controller 21 provisionally selects a candidate for the identification information of the attachment 30 attached to the linkage 16 based on the input information, and a second process in which the controller 21 determines whether an attachment 30 corresponding to the candidate for the identification information provisionally selected in the first process is the attachment 30 attached to the linkage 16 based on the pressure of the hydraulic fluid.

With the working vehicle 1 according to item 9, the controller 21 is able to provisionally select candidate identification information based on the input information and then evaluate the accuracy of the selection of the attachment 30 attached to the linkage 16 based on the pressure of hydraulic fluid. Furthermore, since the controller 21 performs the first process and then performs the second process, even if the point in time at which the input information is inputted into the input 80 differs from the point in time at which the attachment 30 is attached to the linkage 16, the controller 21 can smoothly perform the process to select the identification information.

(Item 10) The working vehicle 1 according to item 9, wherein the controller 21 is configured or programmed to, if no input information has been received or the input information does not satisfy a predetermined selection condition and the controller 21 fails to provisionally select a candidate for the identification information in the first process, select the identification information of the attachment 30 attached to the linkage 16 based on the pressure of the hydraulic fluid in the second process.

With the working vehicle 1 according to item 10, the controller 21 is able to select the identification information of the attachment 30 based on the pressure of hydraulic fluid even if the controller 21 fails to provisionally select the identification information in the first process. Thus, although the accuracy of selecting the identification information may be lower than the case where the provisional selection is performed in the first process and then the second process is performed, the controller 21 selects the identification information of the attachment 30 at least in the second process and therefore can start the predetermined process. This allows the working vehicle 1 to perform work smoothly.

(Item 11) The working vehicle 1 according to any one of items 5 to 8, wherein the controller 21 is configured or programmed to perform a first process in which the controller 21 provisionally selects a candidate for the identification information of the attachment 30 attached to the linkage 16 based on the pressure of the hydraulic fluid, and a second process in which the controller 21 determines whether an attachment 30 corresponding to the candidate for the identification information provisionally selected in the first process is the attachment 30 attached to the linkage 16 based on the input information.

With the working vehicle 1 according to item 11, the controller 21 is able to narrow down candidate pieces of identification information based on the pressure of hydraulic fluid and then evaluate the accuracy of the selection of the attachment 30 attached to the linkage 16 based on the input information. Furthermore, since the controller 21 performs the first process and then performs the second process, even if the point in time at which the attachment 30 is attached to the linkage 16 differs from the point in time at which the input information is inputted into the input 80, the controller 21 can smoothly perform the process to select the identification information.

(Item 12) The working vehicle 1 according to item 7 or any one of items 9 to 11 taken in combination with item 7, wherein the transmitter 33 is configured or programmed to transmit the wireless signal Q1 which includes a criterion, and the controller 21 is configured or programmed to calculate information-for-determination which is based on the pressure of the hydraulic fluid, and select the identification information corresponding to the criterion satisfied by the information-for-determination.

With the working vehicle 1 according to item 12, the controller 21 selects identification information by comparing the information-for-determination calculated based on the pressure of hydraulic fluid with the criterion included in a wireless signal Q1 transmitted from a transmitter 33. Thus, the controller 21 is able to select the identification information of the attachment 30 attached to the linkage 16 with higher accuracy. Furthermore, the controller 21 does not need to store the criterion in advance, and is able to easily and reliably select identification information even if the attachment 30 is attached to the linkage 16 for the first time.

(Item 13) The working vehicle 1 according to any one of items 1 to 11, further including a memory and/or storage 22 to store a plurality of pieces of identification information of a plurality of the attachments 30 attachable to the linkage 16 and one or more criteria such that the plurality of pieces of identification information and the one or more criteria are associated with each other, and the controller 21 is configured or programmed to calculate information-for-determination which is based on the pressure of the hydraulic fluid, and select the identification information associated with one of the one or more criteria that is satisfied by the information-for-determination.

With the working vehicle 1 according to item 13, the controller 21 selects identification information by comparing the information-for-determination calculated based on the pressure of hydraulic fluid with the criterion stored in the storing device (memory and/or storage) 22. Furthermore, since the controller 21 refers to information (identification information and the criterion) stored in the storing device 22, the controller 21 does not refer to identification information not stored in the storing device 22. This makes it possible for the controller 21 to select the identification information of the attachment 30 attached to the linkage 16 with higher accuracy.

(Item 14) The working vehicle 1 according to any one of items 1 to 13, wherein the at least one hydraulic actuator AC includes at least one hydraulic cylinder 14, 15 including a tubular cylinder 65 and a piston rod 66 insertable in the tubular cylinder 65 such that the piston rod 66 is extendable out of and retractable into the tubular cylinder 65, the at least one hydraulic cylinder 14, 15 is operable to extend or retract by extension or retraction of the piston rod 66 from or into the tubular cylinder 65 to drive the lifter C, and the controller 21 is configured or programmed to select the identification information of the attachment 30 attached to the linkage 16 based on the pressure of the hydraulic fluid at at least one of (i) a first port 67*a* located on a piston 66*a* side of the at least one hydraulic cylinder 14, 15 or (ii) a second port 67*b* located on a rod 66*b* side of the at least one hydraulic cylinder 14, 15.

With the working vehicle 1 according to item 14, the controller 21 is able to select the identification information of the attachment 30 based on the pressure of hydraulic fluid at at least one of (i) the first port 67*a* side of the hydraulic cylinder(s) 14, 15 or (ii) the second port 67*b* side of the hydraulic cylinder(s) 14, 15. Thus, the controller 21 is able to select the identification information of the attachment 30 with higher accuracy based on the pressure of hydraulic fluid that changes when an attachment 30 is attached to the linkage 16.

(Item 15) The working vehicle 1 according to item 14, wherein the lifter C includes at least one arm 11 supported on the machine body 2 swingably up and down and including a distal portion supporting the linkage 16 swingably up and down, the at least one hydraulic cylinder 14, 15 includes at least one first hydraulic cylinder 14 to cause the at least one arm 11 to swing and at least one second hydraulic cylinder 15 to cause the linkage 16 to swing, and the controller 21 is configured or programmed to select the identification information of the attachment 30 attached to the linkage 16 based on the pressure of the hydraulic fluid supplied to the at least one first hydraulic cylinder 14 and/or the pressure of the hydraulic fluid supplied to the at least one second hydraulic cylinder 15.

With the working vehicle 1 according to item 15, the controller 21 is able to select the identification information of the attachment 30 based on at least one of the two types of pressures: the pressure of hydraulic fluid supplied to the first hydraulic cylinder(s) 14 and the pressure of hydraulic fluid supplied to the second hydraulic cylinder(s) 15.

(Item 16) The working vehicle 1 according to item 15, wherein the controller 21 is configured or programmed to calculate weight information relating to a weight of the attachment 30 attached to the linkage 16 based on the pressure of the hydraulic fluid supplied to the at least one first hydraulic cylinder 14, calculate dimension information relating to a dimension of the attachment 30 attached to the linkage 16 in a direction extending from the linkage 16 based on the pressure of the hydraulic fluid supplied to the at least one second hydraulic cylinder 15, and select the identification information of the attachment 30 attached to the linkage 16 based on the weight information and the dimension information.

With the working vehicle 1 according to item 16, the controller 21 is able to calculate two types of information, i.e., the weight information and dimension information about the attachment 30, from the pressure of hydraulic fluid, and to select the identification information of the attachment 30 attached to the linkage 16 using the two types of information. Thus, the controller 21 is able to calculate the weight information and dimension information using the pressure of hydraulic fluid which can be relatively easily detected, making it possible to easily select the identification information of the attachment 30 with higher accuracy.

(Item 17) The working vehicle 1 according to item 16, wherein the controller 21 is configured or programmed to calculate a thrust force of the at least one second hydraulic cylinder 15 based on the pressure of the hydraulic fluid supplied to the at least one second hydraulic cylinder 15, and calculate the dimension information based on the thrust force and the weight information.

With the working vehicle 1 according to item 17, the controller 21 is able to calculate the dimension information using the weight information calculated based on the pressure of hydraulic fluid supplied to the first hydraulic cylinder (s) 14. Thus, the controller 21 is able to calculate the dimension information while reducing the calculation processing load.

(Item 18) The working vehicle 1 according to any one of items 14 to 17, wherein the controller 21 is configured or programmed to calculate weight information relating to a weight of the attachment 30 attached to the linkage 16 based on the pressure of the hydraulic fluid supplied to the at least one hydraulic cylinder 14, 15, allow supply of the hydraulic fluid to the attachment 30 attached to the linkage 16 if the weight information indicates that the attachment 30 is attached to the linkage 16, and not allow the supply of the hydraulic fluid if the weight information indicates that no attachments 30 are attached to the linkage 16.

With the working vehicle 1 according to item 18, the controller 21 is able to easily and reliably determine whether or not the attachment 30 is attached to the linkage 16 based on the weight information, and perform control such that hydraulic fluid is supplied when an attachment 30 is attached to the linkage 16.

(Item 19) The working vehicle 1 according to any one of items 14 to 18, further including a user interface 25 to output information indicating that the attachment 30 corresponding to the identification information selected by the controller 21 is attached, the controller 21 is configured or programmed to calculate weight information relating to a weight of the attachment 30 attached to the linkage 16 based on the pressure of the hydraulic fluid supplied to the at least one hydraulic cylinder 14, 15, and the user interface 25 is operable to output information indicating that the attachment 30 corresponding to the identification information selected by the controller 21 is not attached if the weight information indicates that no attachments 30 are attached to the linkage 16.

With the working vehicle 1 according to item 19, the controller 21 is able to easily and reliably determine whether or not the attachment 30 is attached to the linkage 16 based on the weight information, and the user is able to easily know whether or not the attachment 30 is attached to the linkage 16 by checking the user interface 25.

(Item 20) An attachment usage system 100 including a linkage 16 to attach and detach an attachment 30 thereto and therefrom, the linkage 16 being supported by a lifter C on a machine body 2 of a working vehicle 1 such that the linkage 16 is raisable and lowerable by the lifter C, and a controller 21 configured or programmed to select identification information of the attachment 30 attached to the linkage 16 and start a predetermined process based on the selected identification information, wherein the lifter C is operable to be driven by at least one hydraulic actuator AC to raise or lower the linkage 16, and the controller 21 is configured or programmed to select the identification information of the attachment 30 attached to the linkage 16 based on a pressure of hydraulic fluid supplied to the at least one hydraulic actuator AC, the pressure being a pressure of hydraulic fluid supplied when the attachment 30 is caused to be out of contact with a contact surface by the lifter C.

With the attachment usage system 100 according to item 20, it is possible to easily select the identification information of the attachment 30 attached to the linkage 19, i.e., easily select the attachment 30, using the pressure of hydraulic fluid supplied to hydraulic actuator(s) AC. The pressure of hydraulic fluid supplied to actuator(s) is the pressure obtained when the attachment 30 is actually supported, and therefore this makes it possible for the working vehicle 1 to easily improve the accuracy of identifying the attachment 30.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:

a machine body;

a lifter on the machine body;

a linkage to attach and detach an attachment thereto and therefrom, the linkage being supported by the lifter such that the linkage is raisable and lowerable by the lifter;

at least one hydraulic actuator to drive the lifter;

at least one pressure detector to detect a pressure of hydraulic fluid supplied to the at least one hydraulic actuator;

a user interface to display information:

a controller configured or programmed to select identification information relating to the attachment attached to the linkage and start a predetermined process based on the selected identification information; wherein the lifter is operable to be driven by the at least one hydraulic actuator to raise or lower the linkage; and the controller is configured or programmed to select the identification information relating to the attachment attached to the linkage based on the pressure of the hydraulic fluid detected by the at least one pressure detector when the attachment is caused to be out of contact with a contact surface by the lifter, and perform the predetermined process in which the controller causes the user interface to display information indicating that the attachment corresponding to the selected identification information is attached to the linkage.

2. The working vehicle according to claim 1, further comprising an operation actuator to be operated to attach the attachment to the linkage; wherein the controller is configured or programmed to select the identification information relating to the attachment attached to the linkage based on the pressure of the hydraulic fluid detected by the at least one pressure detector when, upon operation of the operation actuator, the attachment is attached to the linkage and then the attachment attached to the linkage is caused to be out of contact with the contact surface by the lifter.

3. The working vehicle according to claim 1, further comprising a memory and/or storage to store a plurality of pieces of identification information relating to a plurality of the attachments attachable to the linkage and one or more criteria such that the plurality of pieces of identification information and the one or more criteria are associated with each other; and the controller is configured or programmed to calculate information-for-determination which is based on the pressure of the hydraulic fluid detected by the at least one pressure detector, and select the identification information associated with one of the one or more criteria that is satisfied by the information-for-determination.

4. The working vehicle according to claim 1, further comprising an operation actuator to be operated to attach the attachment to the linkage; wherein the controller is configured or programmed to select the identification information of relating to the attachment attached to the linkage based on the pressure of the hydraulic fluid detected by the at least one pressure detector when the attachment attached to or to be attached to the linkage is caused to be out of contact with the contact surface by the lifter, and the operation actuator is operated to attach the attachment to the linkage.

5. The working vehicle according to claim 4, wherein the linkage includes a hitch selectively operable in a first mode in which the attachment is allowed to be attached and detached or a second mode in which the attachment is restricted from being attached and detached; and the controller is configured or programmed to select the identification information relating to the attachment attached to the linkage based on the pressure of the hydraulic fluid detected by the at least one pressure detector when the hitch is switched from the first mode to the second mode to attach the attachment thereto by operation of the operation actuator.

6. The working vehicle according to claim 1, further comprising an input to receive input of input information differing from the pressure of the hydraulic fluid detected by the at least one pressure detector; wherein the controller is configured or programmed to select the identification information relating to the attachment attached to the linkage based on the pressure of the hydraulic fluid detected by the at least one pressure detector in addition to the input information.

7. The working vehicle according to claim 6, wherein the input includes the user interface to:

allow a selection of information indicating an attachment from a plurality of the attachments attachable to the linkage; and receive input of the selected information as the input information; and the controller is configured or programmed to select the identification information relating to the attachment attached to the linkage based on the information indicating the attachment selected via the user interface and based on the pressure of the hydraulic fluid detected by the at least one pressure detector.

8. The working vehicle according to claim 6, wherein the controller is configured or programmed to perform:

a first process in which the controller provisionally selects a candidate for the identification information relating to the attachment attached to the linkage based on the pressure of the hydraulic fluid detected by the at least one pressure detector; and a second process in which the controller determines whether an attachment corresponding to the candidate for the identification information provisionally selected in the first process is the attachment attached to the linkage based on the input information.

9. The working vehicle according to claim 6, wherein the input includes a receiver to receive a wireless signal which is periodically transmitted from a transmitter in or on the attachment, which includes the identification information relating to the attachment, and which is compliant with a near field communication standard, the wireless signal being the input information received by the receiver; and the controller is configured or programmed to select the identification information relating to the attachment attached to the linkage based on the wireless signal and the pressure of the hydraulic fluid detected by the at least one pressure detector from one or more pieces of identification information included in one or more of the wireless signals received by the receiver.

10. The working vehicle according to claim 9, wherein the controller is configured or programmed to select the identification information relating to the attachment attached to the linkage based on a received signal strength of the wireless signal and the pressure of the hydraulic fluid detected by the at least one pressure detector.

11. The working vehicle according to claim 10, wherein the transmitter is configured or programmed to transmit the wireless signal which includes a criterion; and the controller is configured or programmed to calculate information-for-determination which is based on the pressure of the hydraulic fluid detected by the at least one pressure detector, and select the identification information corresponding to the criterion satisfied by the information-for-determination.

12. The working vehicle according to claim 6, wherein the controller is configured or programmed to perform:

a first process in which the controller provisionally selects a candidate for the identification information relating to the attachment attached to the linkage based on the input information; and a second process in which the controller determines whether an attachment corresponding to the candidate for the identification information provisionally selected in the first process is the attachment attached to the linkage based on the pressure of the hydraulic fluid detected by the at least one pressure detector.

13. The working vehicle according to claim 12, wherein the controller is configured or programmed to, if no input information has been received or the input information does not satisfy a predetermined selection condition and the controller fails to provisionally select a candidate for the identification information in the first process, select the identification information relating to the attachment attached to the linkage based on the pressure of the hydraulic fluid detected by the at least one pressure detector in the second process.

14. The working vehicle according to claim 1, wherein the at least one hydraulic actuator includes at least one hydraulic cylinder including a tubular cylinder and a piston rod insertable in the tubular cylinder such that the piston rod is extendable out of and retractable into the tubular cylinder;

the at least one hydraulic cylinder is operable to extend or retract by extension or retraction of the piston rod from or into the tubular cylinder to drive the lifter; and the controller is configured or programmed to select the identification information relating to the attachment attached to the linkage based on the pressure, detected by the at least one pressure detector, of the hydraulic fluid at at least one of (i) a first port located on a piston side of the at least one hydraulic cylinder or (ii) a second port located on a rod side of the at least one hydraulic cylinder.

15. The working vehicle according to claim 14, wherein the controller is configured or programmed to:

calculate weight information relating to a weight of the attachment attached to the linkage based on the pressure of the hydraulic fluid detected by the at least one pressure detector;

allow supply of the hydraulic fluid to the attachment attached to the linkage if the weight information indicates that the attachment is attached to the linkage; and not allow the supply of the hydraulic fluid if the weight information indicates that no attachments are attached to the linkage.

16. The working vehicle according to claim 14, wherein the controller is configured or programmed to calculate weight information relating to a weight of the attachment attached to the linkage based on the pressure of the hydraulic fluid detected by the at least one pressure detector; and the user interface is operable to output information indicating that the attachment corresponding to the identification information selected by the controller is not attached if the weight information indicates that no attachments are attached to the linkage.

17. The working vehicle according to claim 14, wherein the lifter includes at least one arm supported on the machine body swingably up and down and including a distal portion supporting the linkage swingably up and down;

the at least one hydraulic cylinder includes at least one first hydraulic cylinder to cause the at least one arm to swing and at least one second hydraulic cylinder to cause the linkage to swing;

the at least one pressure detector includes at least one first pressure detector to detect the pressure of the hydraulic fluid supplied to the at least one first hydraulic cylinder and at least one second pressure detector to detect the pressure of the hydraulic fluid supplied to the at least one second hydraulic cylinder; and the controller is configured or programmed to select the identification information relating to the attachment attached to the linkage based on the pressure of the hydraulic fluid supplied to the at least one first hydraulic cylinder detected by the at least one first pressure detector and/or the pressure of the hydraulic fluid supplied to the at least one second hydraulic cylinder detected by the at least one second pressure detector.

18. The working vehicle according to claim 17, wherein the controller is configured or programmed to:

calculate weight information relating to a weight of the attachment attached to the linkage based on the pressure of the hydraulic fluid supplied to the at least one first hydraulic cylinder detected by the at least one first pressure detector;

calculate dimension information relating to a dimension of the attachment attached to the linkage in a direction extending from the linkage based on the pressure of the hydraulic fluid supplied to the at least one second hydraulic cylinder detected by the at least one second pressure detector; and select the identification information relating to the attachment attached to the linkage based on the weight information and the dimension information.

19. The working vehicle according to claim 18, wherein the controller is configured or programmed to calculate a thrust force of the at least one second hydraulic cylinder based on the pressure of the hydraulic fluid supplied to the at least one second hydraulic cylinder detected by the at least one second pressure detector, and calculate the dimension information based on the thrust force and the weight information.

20. An attachment usage system comprising:

a linkage to attach and detach an attachment thereto and therefrom, the linkage being supported by a lifter on a machine body of a working vehicle such that the linkage is raisable and lowerable by the lifter; and a controller configured or programmed to select identification information relating to the attachment attached to the linkage and start a predetermined process based on the selected identification information; wherein the lifter is operable to be driven by at least one hydraulic actuator to raise or lower the linkage; and the controller is configured or programmed to select the identification information relating to the attachment attached to the linkage based on a pressure of hydraulic fluid supplied to the at least one hydraulic actuator detected by at least one pressure detector operable to detect the pressure of the hydraulic fluid, the pressure being a pressure of hydraulic fluid detected when the attachment is caused to be out of contact with a contact surface by the lifter, and perform the predetermined process in which the controller causes a user interface, which is operable to display information, to display information indicating that the attachment corresponding to the selected identification information is attached to the linkage.

* * * * *